(12) United States Patent
Zhou et al.

(10) Patent No.: US 9,993,811 B2
(45) Date of Patent: Jun. 12, 2018

(54) PROCESS AND APPARATUS FOR PREPARING A MOLECULAR SIEVE AND A CATALYTIC CRACKING CATALYST

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Lingping Zhou, Beijing (CN); Ziyang Liu, Beijing (CN); Jiexiao Zhang, Beijing (CN); Mingde Xu, Beijing (CN); Weilin Zhang, Beijing (CN); Huiping Tian, Beijing (CN); Yuxia Zhu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 483 days.

(21) Appl. No.: 14/438,566

(22) PCT Filed: Oct. 25, 2013

(86) PCT No.: PCT/CN2013/001289
§ 371 (c)(1),
(2) Date: Apr. 24, 2015

(87) PCT Pub. No.: WO2014/063444
PCT Pub. Date: May 1, 2014

(65) Prior Publication Data
US 2015/0314278 A1    Nov. 5, 2015

(30) Foreign Application Priority Data

Oct. 26, 2012  (CN) .......................... 2012 1 0417837
Oct. 26, 2012  (CN) .......................... 2012 1 0418315

(51) Int. Cl.
*C01B 39/00*       (2006.01)
*B01J 29/08*       (2006.01)
(Continued)

(52) U.S. Cl.
CPC ............. *B01J 29/088* (2013.01); *B01J 6/002* (2013.01); *B01J 8/002* (2013.01); *B01J 8/0055* (2013.01);
(Continued)

(58) Field of Classification Search
CPC ....... C01B 39/026; C01B 39/00; C01B 39/06; C01B 39/24; B01J 29/00; B01J 2208/065;
(Continued)

(56) References Cited

U.S. PATENT DOCUMENTS 4,273,753 A  *  6/1981  Chang ................... B01J 20/186
                                                    423/715
4,701,313 A  *  10/1987  Chang ...................... B01J 29/86
                                                    423/326

FOREIGN PATENT DOCUMENTS

CN    1382525 A    12/2002
CN    1683244 A    10/2005
(Continued)

OTHER PUBLICATIONS

Beyer et al, "Preparation of High-silica Faujasites by Treatment with Silicon Tetrachloride", J. Chem., Soc., Faraday Trans. 1, (1985) pp. 2889-2901.*
(Continued)

*Primary Examiner* — David M Brunsman
(74) *Attorney, Agent, or Firm* — Novick, Kim & Lee, PLLC; Allen Xue

(57) ABSTRACT

A process for preparing a catalytic cracking catalyst, which process comprises: a molecular sieve is introduced into a gas-phase ultra-stabilization reactor, the molecular sieve is moved without the conveying of carrier gas from a molecular sieve inlet of the gas-phase ultra-stabilization reactor to
(Continued)

a molecular sieve outlet of the gas-phase ultra-stabilization reactor, and the molecular sieve is contacted and reacted with a gaseous $SiCl_4$ in the gas-phase ultra-stabilization reactor, the molecular sieve resulting from the contacting and the reacting is optionally washed, then mixed with a matrix and water into slurry, and shaped into particles.

19 Claims, 7 Drawing Sheets

(51) Int. Cl.
| | | |
|---|---|---|
| *B01J 29/06* | (2006.01) | |
| *C01B 39/06* | (2006.01) | |
| *B01J 19/24* | (2006.01) | |
| *C01B 39/02* | (2006.01) | |
| *C01B 39/24* | (2006.01) | |
| *B01J 19/00* | (2006.01) | |
| *B01J 19/22* | (2006.01) | |
| *B01J 6/00* | (2006.01) | |
| *B01J 8/00* | (2006.01) | |

(52) U.S. Cl.
CPC ............. *B01J 19/006* (2013.01); *B01J 19/22* (2013.01); *B01J 19/2415* (2013.01); *B01J 29/06* (2013.01); *C01B 39/00* (2013.01); *C01B 39/026* (2013.01); *C01B 39/06* (2013.01); *C01B 39/24* (2013.01); *B01J 2029/081* (2013.01); *B01J 2219/0077* (2013.01); *B01J 2219/18* (2013.01); *B01J 2219/187* (2013.01); *B01J 2219/1943* (2013.01); *B01J 2219/24* (2013.01); *B01J 2229/16* (2013.01); *B01J 2229/32* (2013.01)

(58) Field of Classification Search
CPC .... B01J 2209/16; B01J 2209/32; B01J 8/002; B01J 8/0055; B01J 6/002; B01J 19/006; B01J 19/22; B01J 19/2415; B01J 29/06; B01J 29/088; B01J 2029/081; B01J 2219/0077; B01J 2219/18; B01J 2219/187; B01J 2219/1943; B01J 2219/24
See application file for complete search history.

(56) References Cited

FOREIGN PATENT DOCUMENTS

| CN | 1683245 | A | 10/2005 |
|---|---|---|---|
| CN | 101240372 | A | 8/2008 |
| CN | 201339054 | Y | 11/2009 |
| CN | 102049315 | A | 5/2011 |
| CN | 102049316 | A | 5/2011 |
| CN | 102050459 | A | 5/2011 |
| CN | 102050460 | A | 5/2011 |
| CN | 102320621 | A | 1/2012 |
| CN | 102451657 | A | 5/2012 |
| CN | 102451736 | A | 5/2012 |
| CN | 102452660 | A | 5/2012 |
| CN | 103272637 | A | 9/2013 |

OTHER PUBLICATIONS

Anderson et al, "Zeolites treated with silicon tetrachloride vapor", J. Chem. Soc., Faraday 1, (1986), pp. 1449-1469.*
Roman-Mogul, "Kineteics of direct reduction of unagglomerated iron-ore with coal-char", Univeristy of British Columbia (Dec. 1984).*
The Journal of the Iron and Steel Institute, (1872), p. 113.*

* cited by examiner

PROCESS AND APPARATUS FOR PREPARING A MOLECULAR SIEVE AND A CATALYTIC CRACKING CATALYST

TECHNICAL FIELD

The present invention relates to a process and an apparatus for preparing a molecular sieve. The present invention also relates to a process for preparing a catalytic cracking catalyst.

BACKGROUND

The molecular sieve is a material widely used in the catalytic cracking catalyst, and is also an important component of the catalytic cracking catalyst. The property of the molecular sieve directly affects the reaction performance of the catalytic cracking catalyst. According to different demands, the molecular sieve can be modified in different ways so as to satisfy the use requirement. For example, a molecular sieve with a high silica-alumina ratio is generally considered as being required by the catalytic cracking catalyst.

In the preparation of a molecular sieve with a high silica-alumina ratio, there are the following processes: dealumination and silicon insertion with ammonium hexafluorosilicate, hydrothermal dealumination and silicon insertion, and gas-phase dealumination and silicon insertion (also called as gas-phase ultra-stabilization).

Dealumination and silicon insertion with ammonium hexafluorosilicate (also called as chemical dealumination and silicon insertion) can produce a molecular sieve with a high crystallinity, a high Si/Al ratio and a high thermal stability. The insoluble substance AIF3 and the residual fluorosilicate formed in the dealumination can affect the hydrothermal stability and also pollute the environment.

The hydrothermal process is now widely used in the industry. However, due to the late silicon insertion after dealumination, it is easy for the hydrothermal process to cause the collapsed crystal lattices, and the non-framework aluminum fragments block the pore channels, which not only affect the accessibility of the active centers, but also affect the further improvement of the thermal stability.

Gas-phase chemical dealumination and silicon insertion has the characteristics of uniform dealumination and timely silicon insertion. The resulting product has a high crystallinity retention and a good thermal stability; and the pore channels of the product are expedite.

CN1121903C discloses a process for preparing a rare-earth containing high silica Y-type zeolite, which process comprises: a rare-earth containing Y-type zeolite is dried to the water content of less than 10 wt %, a gas of tetrachlorosilane carried by a dried air is introduced at a weight ratio of tetrachlorosilane:Y-type zeolite=0.1-0.9:1, and the reaction is conducted at 150-600° C. for 10 minutes to 6 hours; after reaction, the purge with a dried air is conducted for 5 minutes to 2 hours; the resulting zeolite is washed with a decationized water to remove soluble by-products such as $Na^+$, $Cl^-$, and $Al^{3+}$ remained in the zeolite. According to the above process, the molecular sieve is immobilized and fixed, and a gas of $SiCl_4$ carried by a dried air is used, and the purge with air is conducted after the reaction. The process cannot be conducted in a continuous manner and has a low product capability.

CN1281493C discloses a rare-earth containing high silica Y-type zeolite and a process for preparing the same. The zeolite contains rare-earth, and has a Si/Al ratio of 5-30, an initial unit cell size of 2.430-2.465 nm, and a ratio of the balanced unit cell size to the initial unit cell size of at least 0.985. The process for preparing the zeolite comprises contacting the rare-earth containing Y-type zeolite with tetrachlorosilane. The contact can be conducted in a reaction apparatus, which is as shown in FIG. 1 and comprises a reaction vessel (1), an inlet (2) and a gas outlet (3). A stirrer (4) is provided inside the reaction vessel (1). A gas-solid separator (5) is installed at the gas outlet (3). The pore diameter and the porosity of the pores contained in the gas-solid separator (5) can ensure that the gas can pass through the pores, but the zeolite solid particles cannot. The stirring rod of the stirrer (4) extends beyond the reaction vessel (1). Under the stirring of the stirrer (4), the rare-earth containing Y-type zeolite is contacted with tetrachlorosilane at 100-500° C. for 5 minutes to 10 hours. The weight ratio of the rare-earth containing Y-type zeolite to tetrachlorosilane is 1:0.05-0.5. The rare-earth containing Y-type zeolite has a Si/Al ratio of 3 to 8 and a unit cell size of 2.45-2.48 nm. It is clear that this process generally requires a long contact time, for example, of several hours. Considering the time for charging before the reaction and discharging after the reaction, in average, the above dealumination and silicon insertion reaction can be conducted at the very most only once in a day shift and only twice even in a day/night shift. Moreover, since it requires the stirring in the reaction vessel, the size of reaction vessel cannot be too large. Under the current situation, the largest reaction vessel for the above dealumination and silicon insertion reaction has a production capability of 600 kg. The further increase in the size of the reaction vessel will result in an insufficient stirring. Therefore, with the above reaction vessel, 1200 kg of high silica molecular sieve can be obtained at the very most per day. Furthermore, in the above prior art process, in order to ensure the high silica content of the obtained molecular sieve, an excessive amount of $SiCl_4$ is used. The use of the excessive amount of $SiCl_4$ undoubtedly increases the production cost and the environment protection cost. On the other hand, the above process needs very multifarious manual operations, such as manual charging, manual discharging and a long time pipeline purge after the reaction. These operations not only bring a large manual labor intensity and have the problem of low production efficiency, but also bring a serious environment pollution and a serious hazard to the healthy of the operation works due to the molecular sieve dust formed during the charging and the discharging and the excessive $SiCl_4$. Therefore, the above gas-phase ultra-stabilization with the reaction vessel is difficult for the industrial production.

CN102049315A discloses a process for preparing the catalyst. The process comprises the molecular sieve is flowed in an inert carrier gas flow with the entrainment of the inert carrier gas flow, and is contacted with the gaseous $SiCl_4$ in a flowing condition. The contact time between the molecular sieve and the gaseous $SiCl_4$ is 10 seconds to 100 minutes. Then the resulting molecular sieve that has been contacted with the gaseous $SiCl_4$ is mixed with a binder, a clay and water into slurry and shaped into particles to produce the catalytic cracking catalyst. According to the above process, the preparation of the catalytic cracking catalyst can accomplish the continuous contact and reaction of the molecular sieve and $SiCl_4$. By controlling the flow rate of the carrier gas and the length of the tube reactor, the contact time between the molecular sieve and $SiCl_4$ can be controlled, and therefore the contact and reaction between the molecular sieve and $SiCl_4$ in the tube reactor can be sufficient. However, according to the above process, the gas-phase ultra-stabilization reaction is conducted with a gas to carry the molecular sieve powder to contact and react with the $SiCl_4$ gas. In order to fluidize the molecular sieve, a large amount of the gas should be used. The weight ratio of the carrier gas to $SiCl_4$ can reach 10-250. Otherwise, it will be easy to block the apparatus. The increase of the gas amount can result in that it is difficult to increase the depth of the dealumination and silicon insertion reaction. There is an inherent conflict between the solid convey and the increase in the depth of the dealumination and silicon insertion reaction. In addition, according to the above process, in order to reach a certain reaction degree, a large amount of $SiCl_4$ is needed. This will bring about the increase in the residual amount of $SiCl_4$ after the gas-phase ultra-stabilization reaction, which not only execrates the harmful environment pollution but also is unfavorable for the effective absorption of the tail gas.

CN102049315A and CN102452660A disclose the gas-phase processes for preparing the high silica molecular sieve. According to those processes, the molecular sieve and $SiCl_4$ are contacted in the presence of inert carrier gas. The inert carrier gas can provide the kinetic energy for the molecular sieve solid powder to overcome the gravitational potential energy, so that the molecular sieve solid powder can be moved upward from the bottom of the reactor along with the gaseous $SiCl_4$, during which, the molecular sieve and $SiCl_4$ are contacted and reacted. CN102452660A discloses mixing the molecular sieve and a gas containing the gaseous $SiCl_4$ to form a mixed stream (wherein the gas containing the gaseous $SiCl_4$ can be the gaseous $SiCl_4$). In the mixed stream, the molecular sieve flow along with the gas, and contacts the gaseous $SiCl_4$ in the gas in a flowing state. Although CN102452660A hints that $SiCl_4$ can be used as both the carrier gas and the reactant, however fails to make any detailed discussion in this aspect. Indeed, in the reaction, the molecular sieve is conveyed by the carrier gas from bottom to top, if only using $SiCl_4$ as carrier gas without any other inert carrier gas, it needs a large amount of the $SiCl_4$ gas. However, if using a large amount of $SiCl_4$ to contact with the molecular sieve, the reaction temperature of the gas-phase ultra-stabilization reaction will result in a very severe gas-phase ultra-stabilization reaction, and must result in that the molecular sieve product after the gas-phase ultra-stabilization reaction has a large loss in the crystallinity. Usually, if the weight ratio of $SiCl_4$ to the molecular sieve is higher than 1, at the beginning of the gas-phase ultra-stabilization reaction, the gas-phase ultra-stabilization reaction will be very severe. The molecular sieve product after the gas-phase ultra-stabilization reaction has a relative crystallinity of less than 40%, even less than 30%. This is unfavorable for retaining the relative crystallinity of the molecular sieve product. In addition, from the aspects of the absorption of the tail gas after the gas-phase ultra-stabilization reaction and the environment pollution, if using $SiCl_4$ as carrier gas to convey the molecular sieve solid powder, the amount of $SiCl_4$ is huge, and it is undoubtedly that a large amount of $SiCl_4$ was left after the gas-phase ultra-stabilization reaction. The absorption of the tail gas will become very difficult, and the environmental pollution will become a severe problem too. Moreover, from the analysis about the economic cost, $SiCl_4$ is costly, and using a large amount of $SiCl_4$ as carrier gas is impermissible in economics. Therefore, using $SiCl_4$ as carrier gas to convey the molecular sieve solid powder is infeasible. Therefore, it is impossible for the gas-phase ultra-stabilization reaction in CN102452660A to use $SiCl_4$ as carrier gas to convey the molecular sieve solid powder.

SUMMARY OF THE INVENTION

Aiming at the problems in the production of molecular sieve and catalytic cracking catalyst by the existing continuous gas-phase chemical dealumination and silicon insertion (the continuous gas-phase ultra-stabilization process), one object of the present invention is to provide a processes for preparing the molecular sieve and the catalytic cracking catalyst, which can reduce the used amount of $SiCl_4$ and are suitable for the continuous industrial production.

Another object of the present invention is to provide an apparatus for preparing the high silica molecular sieve from Na-type molecular sieve. Said apparatus can be used to prepare the high silica molecular sieve from the continuous production of the NaY molecular sieve, and can reduce the used amount of $SiCl_4$ in the preparation of the high silica molecular sieve by the gas-phase chemical process.

In one aspect of the present invention, the present invention provides a process for preparing a molecular sieve, wherein the process comprises: a molecular sieve is introduced into a gas-phase ultra-stabilization reactor, the molecular sieve is moved without the conveying of carrier gas from a molecular sieve inlet of the gas-phase ultra-stabilization reactor to a molecular sieve outlet of the gas-phase ultra-stabilization reactor, and the molecular sieve is contacted and reacted with a gaseous $SiCl_4$ in the gas-phase ultra-stabilization reactor.

In one aspect of the present invention, the present invention provides a process for preparing a catalytic cracking catalyst, wherein the process comprises: a molecular sieve is introduced into a gas-phase ultra-stabilization reactor, the molecular sieve is moved without the conveying of carrier gas from a molecular sieve inlet of the gas-phase ultra-stabilization reactor to a molecular sieve outlet of the gas-phase ultra-stabilization reactor, the molecular sieve is contacted and reacted with a gaseous $SiCl_4$ in the gas-phase ultra-stabilization reactor, and the resulting molecular sieve that has experienced the contact and the reaction, after an optional washing, is mixed with a matrix and water into slurry and shaped into particles (i.e., the resulting molecular sieve that has experienced the contact and the reaction is directly mixed with a matrix and water into slurry, and shaped into particles, or the resulting molecular sieve that has experienced the contact and the reaction is washed, and then mixed with a matrix and water into slurry, and shaped into particles).

In one aspect of the present invention, the present invention provides an apparatus for preparing a molecular sieve, which apparatus comprises a Na-type molecular sieve exchanging device, a calciner, a molecular sieve gas-phase ultra-stabilization reactor and a gas-solid separator, wherein the Na-type molecular sieve exchanging device is for exchanging the Na-type molecular sieve; the calciner is for calcining the exchanged molecular sieve; the molecular sieve gas-phase ultra-stabilization reactor is for subjecting the calcined molecular sieve to the gas-phase chemical dealumination and silicon insertion reaction (also called as the gas-phase ultra-stabilization reaction), wherein the calcined molecular sieve is introduced to the gas-phase ultra-stabilization reactor, the molecular sieve is moved without the conveying of carrier gas from a molecular sieve inlet of the gas-phase ultra-stabilization reactor to a molecular sieve outlet of the gas-phase ultra-stabilization reactor, and the molecular sieve is contacted and reacted with a gaseous $SiCl_4$ in the gas-phase ultra-stabilization reactor; the gas-solid separator is for separating the molecular sieve discharged from the gas-phase ultra-stabilization reactor from the unreacted tetrachlorosilane; wherein said gas-phase ultra-stabilization reactor comprises a molecular sieve inlet, an optional tetrachlorosilane inlet and a molecular sieve outlet, said gas-phase ultra-stabilization reactor can move the molecular sieve introduced therein from the molecular sieve inlet to the molecular sieve outlet without the conveying of carrier gas.

Preferably, the molecular sieve outlet of the calciner and the molecular sieve inlet of the gas-phase ultra-stabilization reactor are communicated with each other, so that the calcined molecular sieve obtained from the calciner can be directly introduced to the gas-phase ultra-stabilization reactor to react, and therefore the continuous production can be accomplished. It is not necessary to cool and package the molecular sieve or store the molecular sieve, and then warm the molecular sieve for introduction. Since the gas-phase ultra-stabilization apparatus of the present invention does not need the convey of the molecular sieve with an inert gas, it can be easy and convenient to accomplish the communication between the gas-phase ultra-stabilization reactor and the calciner.

Said molecular sieve exchanging device can be an existing molecular sieve exchanging device. It comprises an exchanger and an filtering device for the exchanged molecular sieve (also called as a second filtering device), and can further comprise a first drying device. The first drying device is for drying the molecular sieve obtained from the filtering device for the exchanged molecular sieve. Then the dried molecular sieve can be introduced to the calciner for calcination. Alternatively the exchanged molecular sieve obtained from the second filtering device can be directly introduced to the calciner for calcination without drying. The filtering device for the exchanged molecular sieve can be a belt filter, which is also called as a second belt filter. Due to using the belt filter, the filtration can be continuously conducted. The second filtering device can be directly connected to the exchanger, and the second belt filter can be directly connected to the calciner.

The Na-type molecular sieve can be commerically available or can be synthesized according to the known method. The known method generally comprises the synthesis by crystallization. The product from the synthesis by crystallization can be filtered and optionally dried to produce a Na-type molecular sieve. The apparatus generally further comprises a filtering device for filtering the product from the synthesis by crystallization (also called as a first filtering device), preferably the first filtering device is a belt filter (also called as a first belt filter); and a drying device for drying the filter cake obtained from the first filtering device (also called as a second drying device). The first belt filter, the second drying device, the exchanger, the second belt filter and the calciner are successively communicated with each other, so that the Na-type molecular sieve can go through the apparatus once for exchanging and calcining, and then go into the gas-phase ultra-stabilization reactor for the reaction of dealumination and silicon insertion.

According to the present invention, the molecular sieve is moved without the conveying of carrier gas from a molecular sieve inlet of the gas-phase ultra-stabilization reactor to a molecular sieve outlet of the gas-phase ultra-stabilization reactor, and the molecular sieve is contacted and reacted with a gaseous $SiCl_4$ in the gas-phase ultra-stabilization reactor, The conditions for contacting and reacting comprise: the solid content of the molecular sieve introduced into the gas-phase ultra-stabilization reactor is preferably greater than 98 wt % (the loss on ignition is less than 2 wt %), wherein the solid content of said molecular sieve refers to a ratio of the weight of the molecular sieve after the high temperature calcination to the weight of the molecular sieve before the calcination (i.e. the content based on the ignition, with reference to RIPP32-90 analysis method, Analysis Methods for Petrochemical Industry, (RIPP Test Method), edited by Yang Cuiding et al., Science Press, 1990), the calcination temperature is generally 800° C., the solid content of the molecular sieve=100%−the water content of the molecular sieve; the weight ratio of $SiCl_4$ introduced to the gas-phase ultra-stabilization reactor to the molecular sieve introduced to the gas-phase ultra-stabilization reactor is preferably 0.01-1, more preferably 0.05-0.60, e.g. 0.05-0.30; the contact temperature of the molecular sieve and the gaseous $SiCl_4$ is 250-700° C., e.g. 300-650° C.; the residence time of the molecular sieve in the gas-phase ultra-stabilization reactor is 10 seconds to 120 minutes, preferably 1 minute to 60 minutes.

For the purpose that the molecular sieve can be moved from the molecular sieve inlet of the gas-phase ultra-stabilization reactor to the outlet of the gas-phase ultra-stabilization reactor (also called as the reactor hereinafter) without the conveying of carrier gas, the molecular sieve that is introduced into the reactor can be moved by a mechanical conveying device and/or by gravity. During the moving, the molecular sieve can contact and react with $SiCl_4$ in the reactor. Because no gaseous carrier gas that is used to fluidize the molecular sieve is introduced to the reactor, the molecular sieve in the gas-phase ultra-stabilization reactor is kept in a dense phase condition. The bed layer of the molecular sieve has a relative high density. It is preferable that $SiCl_4$ is vaporized and then introduced to the gas-phase ultra-stabilization reactor. The molecular sieve is moved in a space containing $SiCl_4$. The gaseous $SiCl_4$ can enter the interstices of the molecular sieve particles under the effect of diffusion and/or agitation, and further diffuse into the pores inside the molecular sieve particles to conduct the reaction of dealumination and silicon insertion. Because the molecular sieve is continuously moved from the inlet to the outlet in the gas-phase ultra-stabilization reactor, the molecular sieve can be continuously introduced to the reactor through the molecular sieve inlet of the reactor, and the molecular sieve that has experienced the gas-phase ultra-stabilization can be continuously discharged from the outlet of the reactor. The continuous gas-phase ultra-stabilization can be accomplished. Since it is neither necessary to introduce the carrier gas that conveys the molecular sieve, nor to dilute or carry tetrachlorosilane with a diluting gas, the volume of the reactor can be sharply reduced. Furthermore, no introduction of the carrier gas can greatly reduce the heat carried away by the carrier gas and decrease the cost for the purification of the carrier gas. Unexpectedly, it can increase the ultra-stabilization rate and decrease the reaction time; and it may increase the depth of the gas-phase ultra-stabilization, and the obtained product has a better uniformity.

In the processes for preparing the molecular sieve and the catalytic cracking catalyst according to the present invention, the molecular sieve and $SiCl_4$ are continuously introduced to the gas-phase ultra-stabilization reactor; the molecular sieve is subjected to a sufficient reaction in the tube reactor by gravity and/or by providing a kinetic force, and then discharged from the outlet to the gas-solid separator; the solid and the gas are separated in the gas-solid separator; the gas is introduced to an absorber to absorb a small amount of excessive $SiCl_4$ and then directly emitted; the solid can be continuously discharged from the separator or kept in the separator and discharged at regular intervals. Therefore, the process for preparing the molecular sieve according to the present invention can accomplish the continuous contact and reaction of the molecular sieve and $SiCl_4$; the residence time of the molecular sieve in the reactor and the contact time between the molecular sieve and $SiCl_4$ can be controlled by controlling the convey rate of the molecular sieve and/or the length of the reactor, so that the contact and reaction of the molecular sieve and $SiCl_4$ can be uniformly and sufficiently conducted in the tube reactor; and the reaction temperature can be controlled by using a tube reactor provided with a heater and adjusting the ratio of the addition amount of the molecular sieve to the addition amount of $SiCl_4$, so that the different reaction conditions and degrees can be controlled and the molecular sieve products with different dealumination degrees can be obtained.

Specifically, the present invention provides the following technical solutions:

100. A gas-phase ultra-stabilization reactor, which comprises a tube body, a molecular sieve inlet, a molecular sieve outlet and an optional tetrachlorosilane inlet, the molecular sieve inlet is provided at one end of the tube body, and the molecular sieve outlet is provided at the opposite end of the tube body, wherein the end provided with the molecular sieve inlet is not below the opposite end provided with the molecular sieve outlet in the elevation direction.

101. The gas-phase ultra-stabilization reactor according to any of Solutions 100-111 except 101, wherein said reactor is a tube reactor or a belt transport reactor.

102. The gas-phase ultra-stabilization reactor according to any of Solutions 100-111 except 102, wherein said reactor comprises a gravity conveying device and/or a mechanical conveying device, e.g. a reciprocating piston conveyor, a tube chain conveyor, a screw conveyor, a tube belt conveyor, a tube gravity conveyor, a belt conveyor or a combination thereof.

103. The gas-phase ultra-stabilization reactor according to any of Solutions 100-111 except 103, wherein said reactor comprises a gravity conveying device, and at least a part of or all of the tube body is configured as being rotatable around the axis of the tube body.

104. The gas-phase ultra-stabilization reactor according to any of Solutions 100-111 except 104, wherein the angle between the axis of the tube body and the horizontal plane can be 0-90°, for example, 10°, 20°, 30°, 40°, 50°, 60°, 70°, 80° and a range between any two of the above point values.

105. The gas-phase ultra-stabilization reactor according to any of Solutions 100-111 except 105, wherein said reactor comprises a tetrachlorosilane inlet, which is provided at the end of the tube body provided with the molecular sieve inlet and is close to the molecular sieve inlet.

106. The gas-phase ultra-stabilization reactor according to any of Solutions 100-111 except 106, wherein said reactor comprises at least one seizing plate and/or at least one dam plate, and the seizing plate and the dam plate are installed onto the inner wall of the tube body.

107. The gas-phase ultra-stabilization reactor according to any of Solutions 100-111 except 107, wherein the tube body of said reactor has a length of 5-200 meters, 7-150 meters, 15-130 meters, or 20-80 meters; the tube body of the reactor has an inner diameter of 0.01-6 meters, 0.02-3 meters, 0.1-2 meters, or 0.2-1.5 meters; the ratio of the length of the tube body to the inner diameter of the tube body of the reactor is not less than 1, 3-100:1, or 10-100:1.

108. The gas-phase ultra-stabilization reactor according to any of Solutions 100-111 except 108, wherein the tube body configured as being rotatable around the axis of the tube body comprises 20% or more, 20%-100%, or 20-90% of the length of the tube body of the reactor.

109. The gas-phase ultra-stabilization reactor according to any of Solutions 100-111 except 109, wherein an inner tube is provided in the tube body, and the annular space between the inner tube and the tube body form a reaction zone.

110. The gas-phase ultra-stabilization reactor according to any of Solutions 100-111 except 110, wherein the axis of the tube body of the reactor, in the direction from the molecular sieve inlet to the molecular sieve outlet, drops monotonously in the elevation direction or lacks any rising portion in the elevation direction.

111. The gas-phase ultra-stabilization reactor according to any of Solutions 100-111 except 111,
wherein the tangent line at any point on the axis of the tube body of the reactor, taking the direction from the molecular sieve inlet to the molecular sieve outlet as the positive direction of the tangent line of the axis, has a vector of zero in the elevation direction; or has a positive vector in the vertical downward direction.

201. An apparatus for preparing a molecular sieve, which apparatus comprises a Na-type molecular sieve exchanging device, a calciner, a molecular sieve gas-phase ultra-stabilization reactor and a gas-solid separator, the molecular sieve gas-phase ultra-stabilization reactor is any one of the molecular sieve gas-phase ultra-stabilization reactors according to Solutions 100-111, wherein the outlet of the calciner is directly communicated with the molecular sieve inlet of the gas-phase ultra-stabilization reactor;
wherein the Na-type molecular sieve exchanging device is for exchanging the Na-type molecular sieve, the calciner is for calcining the exchanged molecular sieve,
the molecular sieve gas-phase ultra-stabilization reactor is for subjecting the calcined molecular sieve to the gas-phase chemical dealumination and silicon insertion reaction,
the gas-solid separator is for separating the molecular sieve discharged from the gas-phase ultra-stabilization reactor from the unreacted tetrachlorosilane.

300. A process for preparing a molecular sieve, which process comprises:
a molecular sieve is introduced into a gas-phase ultra-stabilization reactor,
the molecular sieve is moved without the conveying of carrier gas from a molecular sieve inlet of the gas-phase ultra-stabilization reactor to a molecular sieve outlet of the gas-phase ultra-stabilization reactor, and
the molecular sieve is contacted and reacted with a gaseous $SiCl_4$ in the gas-phase ultra-stabilization reactor.

301. The process according to Solution 300, wherein the weight ratio of $SiCl_4$ to the molecular sieve is 0.01-1, or 0.05-0.60, or 0.05-0.30.

302. The process according to Solution 300, wherein the molecular sieve and the gaseous $SiCl_4$ are contacted and reacted in the gas-phase ultra-stabilization reactor to produce an ultra-stabilized molecular sieve, and the ultra-stabilized molecular sieve has a relative crystallinity of greater than 50%.

303. The process according to Solution 300, wherein the contact temperature of the molecular sieve and the gaseous $SiCl_4$ in the reactor is 250-700° C., and the reaction time of the molecular sieve in the gas-phase ultra-stabilization reactor is 10 seconds to 100 minutes.

304. The process according to Solution 300, wherein the gas-phase ultra-stabilization reactor is the reactor according to any of Solutions 100-111.

305. The process according to Solution 300, wherein the gas-phase ultra-stabilization reactor is the reactor according to Solution 103, wherein the tube body of the reactor is a straight tube, at least a part of the tube body is configured as being rotatable around the axis of the tube body at a rotation speed of 0.05-40 rpm, preferably 0.1-15 rpm.

400. A process for preparing a catalytic cracking catalyst, which process comprises: a molecular sieve is introduced into a gas-phase ultra-stabilization reactor, the molecular sieve is moved without the conveying of carrier gas from a molecular sieve inlet of the gas-phase ultra-stabilization reactor to a molecular sieve outlet of the gas-phase ultra-stabilization reactor, and the molecular sieve is contacted and reacted with a gaseous $SiCl_4$ in the gas-phase ultra-stabilization reactor, the molecular sieve resulting from the contacting and the reacting is optionally washed, then mixed with a matrix and water into slurry, and shaped into particles.

401. The process according to 400, wherein the weight ratio of $SiCl_4$ to the molecular sieve is 0.01-1, or 0.05-0.60, or 0.05-0.30.

402. The process according to 400, wherein the molecular sieve and the gaseous $SiCl_4$ are contacted and reacted in the gas-phase ultra-stabilization reactor to produce an ultra-stabilized molecular sieve, the ultra-stabilized molecular sieve has a relative crystallinity of greater than 50%.

403. The process according to 400, wherein the contact temperature of the molecular sieve and the gaseous $SiCl_4$ in the reactor is 250-700° C., the reaction time of the molecular sieve in the gas-phase ultra-stabilization reactor is 10 seconds to 100 minutes.

404. The process according to 400, wherein gas-phase ultra-stabilization reactor is the reactor according to any one of Solutions 100-111.

405. The process according to 400, wherein the gas-phase ultra-stabilization reactor is the reactor according to Solution 103, wherein the tube body of the reactor is a straight tube, at least a part of the tube body is configured as being rotatable around the axis of the tube body at a rotation speed of 0.05-40 rpm, preferably 0.1-15 rpm.

In comparison to the existing reaction vessel-based gas-phase ultra-stabilization, the present invention can accomplish the continuous gas-phase ultra-stabilization reaction. All of reaction operations can be continuous and automatic. The manual labor intensity is low, and the production efficiency is high, and the product properties are stable. The present invention accomplishes the industrialization of the molecular sieve continuous gas-phase ultra-stabilization process. It is demonstrated that according to the vessel-based process as disclosed in CN1281493C, even in a day/night shift, 1200 kg of high silica molecular sieve can be obtained at the very most per day. However, according to the apparatus of the present invention, 1000 kg of high silica molecular sieve can be obtained per hour, 24000 kg per day, which is 20 times in efficiency over the vessel-based process of CN1281493C. Moreover, the worker's labor intensity is sharply reduced. Therefore, the apparatus of the present invention can have a remarkable economic benefit. In comparison with the existing continuous gas-phase ultra-stabilization process, the present invention uses the conveyor device-based reactor. It can make the molecular sieve and the vaporized $SiCl_4$ gas directly contact at a relatively high reaction temperature and sufficiently experience the dealumination and silicon insertion reaction. The present invention not only solves the contradiction problem between the conveying of the molecular sieve solid powder and the reaction time and the gas-phase ultra-stabilization reaction depth in the existing molecular sieve continuous ultra-stabilization technology, but also reduces the used amount of $SiCl_4$ and the amount of $SiCl_4$ in the tail gas due to the increased gas-phase ultra-stabilization reaction depth and the sufficient reaction. The present invention is favorable for the tail gas absorption and reduces the environmental pollution from the pollution source. Furthermore, due to the increased gas-phase ultra-stabilization reaction depth, the activity and the stability of the gas-phase ultra-stabilization molecular sieve can be further improved. Therefore, the present invention can reduce the used amount of the molecular sieve in the catalyst preparation, and further reduce the catalyst cost.

BEST MODES OF CARRYING OUT THE INVENTION

Figure 1:
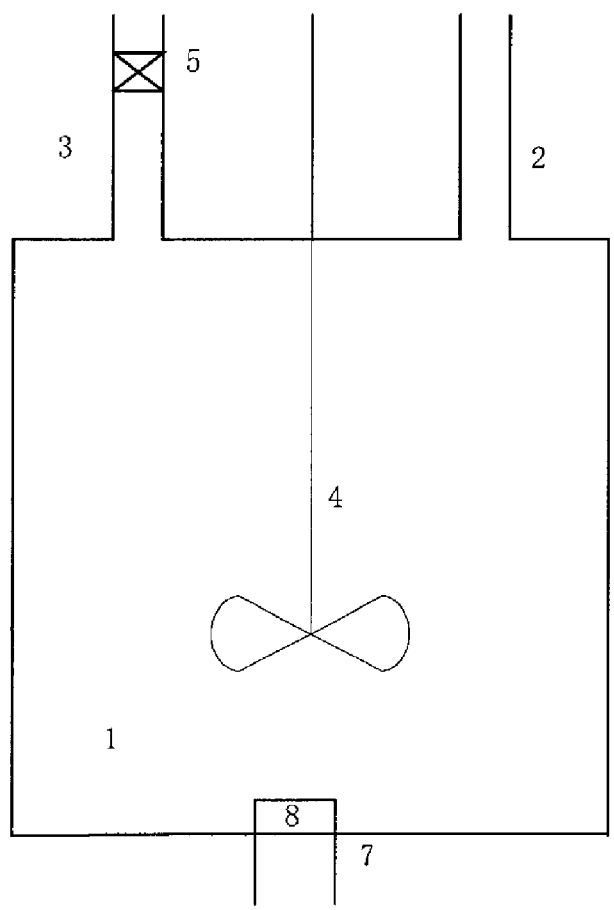
FIG. 1 shows a structure illustration of the apparatus for preparing the molecular sieve according to the prior art.

In the process for preparing the molecular sieve and the catalytic cracking catalyst according to the present invention, a molecular sieve is continuously introduced to a gas-phase ultra-stabilization reactor, the molecular sieve is continuously moved without the conveying of carrier gas from the molecular sieve inlet to the molecular sieve outlet, and contacted with a tetrachlorosilane gas in the gas-phase ultra-stabilization reactor to conduct an ultra-stabilization reaction while the tetrachlorosilane gas is continuously introduced to the reactor.

In the process for preparing the molecular sieve and the catalytic cracking catalyst according to the present invention, the tetrachlorosilane gas can be introduced to the reactor in a liquid form and then vaporized in the reactor and reacted with the molecular sieve. However, for a uniform reaction, it is preferable that the tetrachlorosilane gas is vaporized and then introduced to the gas-phase ultra-stabilization reactor. The molecular sieve and the vaporized tetrachlorosilane gas are introduced to the gas-phase ultra-stabilization reactor. In the reactor, the tetrachlorosilane gas comes into the interstices and pores of the molecular sieve particles under stirring and/or by diffusion to conduct the dealumination and silicon insertion reaction. The molecular sieve is moved by gravity and/or by a mechanical force. The tetrachlorosilane gas on the whole moves along the moving direction of the molecular sieve and reacts with the molecular sieve. Due to the gas-phase ultra-stabilization reaction, the concentration of the tetrachlorosilane gas in the molecular sieve interstices gradually decreases along the moving direction of the molecular sieve. When the molecular sieve reaches the molecular sieve outlet of the reactor, the concentration of the tetrachlorosilane gas in the molecular sieve has dropped to a very low level. That is to say, almost all of the tetrachlorosilane gas takes part in the gas-phase ultra-stabilization reaction as an effective reactant in the reactor. Therefore, the consumption of the tetrachlorosilane gas can be reduced, and the effect of dealumination and silicon insertion can be improved.

In the gas-phase ultra-stabilization reactor (hereinafter also called as the reactor) of the present invention, the gas-phase ultra-stabilization reaction of the molecular sieve is conducted in a fluidized bed, a moving bed, a fixed bed or a combination thereof. Since no carrier gas is used to convey the molecular sieve, therefore the concentration of the molecular sieve particles, as one of the reactants, is relatively high. The molecular sieve particles are moved by a conveying device. In the present invention, the tetrachlorosilane gas can be directly introduced to the reactor without a dilution gas to dilute, and therefore the concentration of the tetrachlorosilane gas, as the other reactant, is relatively high too. In order to accomplish the moving of the molecular sieve in the reactor without the conveying of carrier gas, a mechanical (kinetic force) conveying device and/or a gravity conveying device can be used in the reactor. For example, a reciprocating piston conveyor, a tube chain conveyor, a screw conveyor, a tube belt conveyor, a tube gravity conveyor, a belt conveyor or a combination thereof can be used. In this way, the molecular sieve can be moved from the molecular sieve inlet of the reactor to the molecular sieve outlet of the reactor. The molecular sieve discharged from the molecular sieve outlet of the gas-phase ultra-stabilization reactor is then introduced to the gas-solid separator for separation.

The reactor according to the present invention can be any reactor that can satisfy the condition for contacting the molecular sieve with the gaseous $SiCl_4$. The gas-phase ultra-stabilization reactor can be a tube reactor or a transport reactor (or a moving bed). Preferably, the dealumination and silicon insertion reaction is conducted in a tube reactor or a belt transport reactor. The reactor comprises a molecular sieve inlet, an optional tetrachlorosilane inlet and a molecular sieve outlet. The tetrachlorosilane gas inlet can be the same inlet for the molecular sieve (i.e. the molecular sieve and the tetrachlorosilane can have the same inlet). Alternatively, the tetrachlorosilane inlet can be located at a different position from the molecular sieve inlet, but is preferably close to the molecular sieve inlet, so that the tetrachlorosilane gas and the molecular sieve can be in a parallel flow. In case that the gas-phase ultra-stabilization reactor has only one inlet, both the molecular sieve and $SiCl_4$ are introduced to the tube body of the reactor via the only inlet. For the cooperation with other plants in the industrial continuous production, the molecular sieve is generally a hot molecular sieve from the calciner. That is to say, the inlet is generally in communication with the calciner. Therefore, preferably, the gas-phase ultra-stabilization reactor further comprises a tetrachlorosilane inlet (the second inlet). The tetrachlorosilane inlet is located on the tube body and at a position adjacent to the molecular sieve inlet (the first inlet). The tetrachlorosilane inlet can be upstream or downstream of the molecular sieve inlet. Preferably, the tetrachlorosilane inlet is downstream of the molecular sieve inlet. The upstream or downstream relationship is relative to the moving direction of the molecular sieve in the reactor (i.e., the direction from the molecular sieve inlet to the molecular sieve outlet is the direction from the upstream side to the downstream side).

According to the present invention, after the tetrachlorosilane gas is introduced to the gas-phase ultra-stabilization reactor, it does not need the carrier gas to convey; therefore the gas in the gas-phase ultra-stabilization reactor comprises the tetrachlorosilane gas and the gas entrained by the molecular sieve such as air. The tetrachlorosilane gas and the molecular sieve are subjected to the ultra-stabilization reaction, in which the silicon can enter the framework of the molecular sieve by the isomorphous substitution reaction with the aluminum in the molecular sieve. The removed aluminum and the chlorine can form an aluminum-chlorine compound. Therefore, the gas-phase ultra-stabilization reactor can be only provided with one outlet (herein, it is also called as the molecular sieve outlet). The molecular sieve, the gas entrained by the molecular sieve and a small amount of the unreacted tetrachlorosilane gas can be discharged via the outlet from the gas-phase ultra-stabilization reactor and introduced to the gas-solid separator.

For the processes and the apparatuses for preparing the molecular sieve and the catalytic cracking catalyst according to the present invention, the gas-phase ultra-stabilization reactor can be a tube reactor. The tube reactor can comprise a molecular sieve inlet, a tube body, a molecular sieve conveying device, a molecular sieve outlet and an optional tetrachlorosilane inlet. The tube reactor can further comprise a gas outlet. The molecular sieve starting material can be introduced from the molecular sieve inlet of the gas-phase ultra-stabilization reactor into the tube body, then moved to the molecular sieve outlet along the tube body, and discharged from the gas-phase ultra-stabilization reactor. The tetrachlorosilane can be introduced from the optional tetrachlorosilane inlet to the gas-phase ultra-stabilization reactor, and contacted and reacted with the molecular sieve. The tube body may be any form of the tube that can make the molecular sieve move therein. For example, it can be a straight tube, a broken line tube, a bent tube or a combination thereof. For example, it can be a combined tube, one segment of which is a straight tube, and the other segment of which is a bent tube or a spiral tube. The cross-section of the tube body can be in any shape, e.g. square, round, and polygonal. The tube body is preferably a round tube.

For the processes and the apparatuses for preparing the molecular sieve and the catalytic cracking catalyst according to the present invention, the gas-phase ultra-stabilization reactor can be a tube reactor. The tube reactor comprises a tube body, an inlet and an outlet. The inlet and the outlet can be located at the opposite ends of the tube body. The molecular sieve can be introduced from the molecular sieve inlet to the reactor, and moved along the axis of the tube body to contact and react with tetrachlorosilane. After the reaction, the molecular sieve can be discharged from the molecular sieve outlet. The discharged molecular sieve and a small amount of the unreacted tetrachlorosilane enter a gas-solid separator. The molecular sieve can be moved in the tube reactor by gravity and/or by mechanical convey. For example, the molecular sieve can be moved from the molecular sieve inlet through the tube body to the molecular sieve outlet by means of a reciprocating piston conveyor, a tube chain conveyor, a screw conveyor, a tube belt conveyor, a tube gravity conveyor, a belt conveyor or a combination thereof. The contact time between the molecular sieve and the gaseous $SiCl_4$ can be 10 seconds to 120 minutes, e.g. 1-60 minutes, or 4-39 minutes. The molecular sieve and the gaseous SiCl$_4$ can be optionally heated during the contacting, so that the contact temperature of the molecular sieve and the gaseous SiCl$_4$ can be 250-700° C. It is found by the inventors that the length of the tube reaction (i.e. the length of the tube body) being 5-200 meters can be optimal. Therefore, it is preferable according to the present invention that the length of the tube reactor is 5-200 meters, such as 7-150 meters, e.g. 15-130 meters, or 20-80 meters. The (inner) diameter of the tube reactor is preferably 0.01-6 meters, such as 0.02-3 meters, e.g. 0.1-2 meters or 0.2-1.5 meters. The ratio of the length of the tube body to the inner diameter of the tube body is not less than 1, e.g. 3-100:1, or 10-100:1. For a tube reactor having a diameter of 0.01-1.5 meters, e.g. 0.1-1.5 meters, and a length of 5-130 meters, e.g. 15-130 meters, the introduced amount (flow rate) of the molecular sieve is preferably 50-2000 kg/hr, e.g. 100-1500 kg/hr, or 200-1200 kg/hr. Under the above conditions, it not only can guarantee that the molecular sieve and the gaseous SiCl$_4$ continuously pass through the tube reactor, but also can guarantee the molecular sieve and the gaseous SiCl$_4$ sufficiently contact and react with each other. Under the same dealumination degree, the present invention can substantially reduce the used amount of the gaseous SiCl$_4$. The molecular sieve and the heated and vaporized SiCl$_4$ can contact in a flow state under the continuous convey mechanism. The tube body can be horizontal or inclined, provided that the molecular sieve can be moved without the conveying of carrier gas in the tube body. For example, the angle between the axis of the tube body and the horizontal plane can be 0-90°, for example, 0-55°.

The tube body is tubular, and can be in a straight line shape, in a broken line shape, in a screw shape, in a wave shape, or in any other shapes. The straight line shape and the broken line shape are preferable according to the present invention. The tubes in the straight line shape and the broken line shape not only can reduce the size and the covering area of the apparatus and lower the difficulty in construction, but also can accomplish the sufficient reaction between the molecular sieve and SiCl$_4$, and facilitate controlling the residence time of the molecular sieve. In order to further guarantee the sufficient contact in a short tube and prevent or reduce the inferior quality of the molecular sieve due to the non-uniform reaction in the tube reactor, the tube reactor can be configured so that the molecular sieve may be moved in the reactor by gravity and/or by mechanical convey. For example, it can be considered that a continuous convey mechanism can be installed in the tube reactor, or the molecular sieve can be moved by gravity. In this way, not only the issue about the continuous convey of the solid powder can be solved, but also the total amount of the reactants can be increased. The convey mechanism can be any continuous convey mechanism that can guarantee the flow and the reaction of the molecular sieve and SiCl$_4$. The gravity conveying device and the kinetic force conveying device are preferable according to the present invention.

Figure 2A:
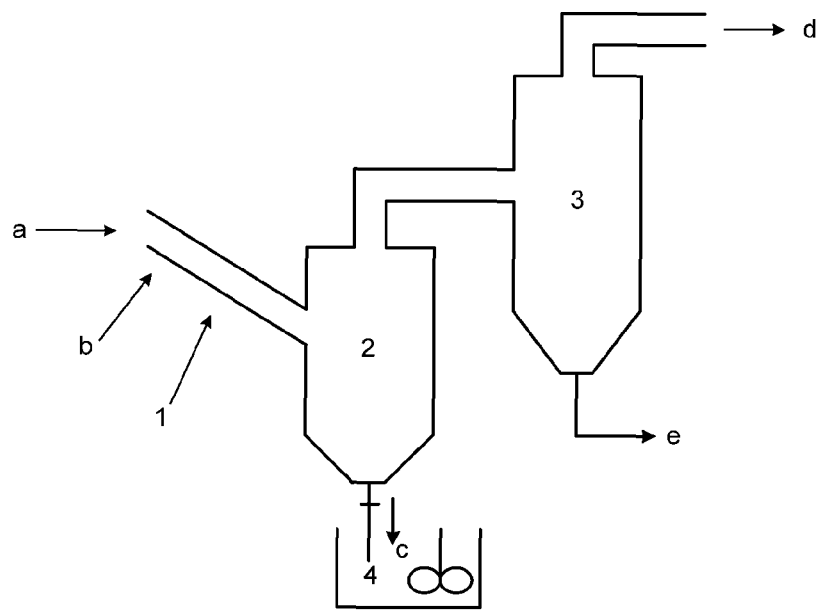
FIG. 2a and FIG. 2b show structure illustrations of the apparatus for preparing the molecular sieve according to the present invention.

As shown in FIG. 2a, the gas-phase ultra-stabilization reaction apparatus comprises a gas-phase ultra-stabilization reactor 1, a gas-solid separator 2, an absorber 3, and a slurry mixer 4. The gas-phase ultra-stabilization reactor 1 is provided with a molecular sieve inlet (a) and a gas-phase tetrachlorosilane inlet (b). The gas-solid separator 2 is provided with a molecular sieve outlet (c). A gas outlet at the top of the gas-solid separator is communicated with the absorber 3. The absorber 3 is provided with a gas outlet (d) for discharging the gas after the absorption of tetrachlorosilane, and an absorption liquid outlet (e) for discharging the absorption liquid that has absorbed tetrachlorosilane. The slurry mixer 4 receives the molecular sieve after reaction from the molecular sieve outlet (c). A matrix and a binder can be introduced to the slurry mixer to form the mixed molecular sieve slurry. According to the present invention, the molecular sieve obtained from the gas-solid separation, after being mixed with water into slurry, can be directly used to produce the catalyst; or the dry molecular sieve powder can be used to produce the catalyst. It is unnecessary to wash the molecular sieve that just undergoes the gas-phase ultra-stabilization reaction.

Figure 2B:
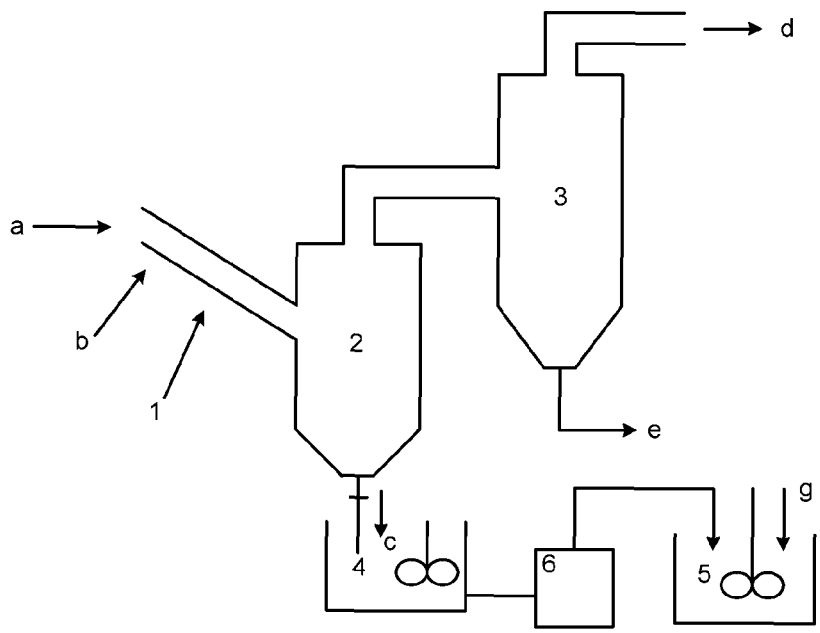

As shown in FIG. 2b, the gas-phase ultra-stabilization reaction apparatus comprises a gas-phase ultra-stabilization reactor 1, a gas-solid separator 2 and an absorber 3. The gas-phase ultra-stabilization reactor 1 is provided with a molecular sieve inlet (a) and a gas-phase tetrachlorosilane inlet (b). The gas-solid separator 2 is provided with a molecular sieve outlet (c). A gas outlet at the top of the gas-solid separator is communicated with the absorber 3. The absorber 3 is provided with a gas outlet (d) for discharging the gas after the absorption of tetrachlorosilane, and an absorption liquid outlet (e) for discharging the absorption liquid that has absorbed tetrachlorosilane. The molecular sieve discharged from the molecular sieve outlet (c) is introduced to a washer 4 for washing, and then to a filtering/drying unit 6 to obtain a washed molecular sieve, wherein the drying is an optional step. The washed molecular sieve can be introduced to the slurry mixer 5, and mixed with the matrix g (that is introduced to the slurry mixer 5) into slurry. The resulting slurry is then introduced to a next unit for being shaped into particles.

According to the present invention, the Na-type molecular sieve exchanging device preferably comprises an exchanger and a second filter. The exchanger can be any device that can accomplish the exchange between the molecular sieve and the exchanging liquor. The exchanger can be an exchanging drum, for example, a vessel of round shape or rectangular shape. At the top of the exchanger are provided a molecular sieve inlet and an exchanging liquor inlet. At the bottom of the exchanger is provided a molecular sieve slurry outlet. The slurry from the outlet is introduced to the second filter for filtering. Alternatively, an exchanging zone can be provided on a belt filter. The molecular sieve to be exchanged can be placed on the belt filter, and leached with the exchanging liquor. The second filter is preferably a vacuum belt filter. For example, the exchanging drum can be a cylindrical drum that can have a conical bottom head. Preferably, its height-to-diameter ratio (the ratio of the height to the inner diameter) is preferably not less than 1:1, e.g. 1:1-5:1. Both its molecular sieve inlet and its exchanging liquor inlet are provided at the top of the drum. Its molecular sieve slurry outlet is provided at the bottom of the drum. The exchanging for NaY molecular sieve can be conducted as required. For example, the exchanging can be conducted with one or more of ammonium salt (e.g. ammonium sulfate, ammonium nitrate, ammonium chloride), and rare-earth salt (e.g. rare-earth nitrate, rare-earth chloride). The use of the belt filter can accomplish a continuous exchanging of the molecular sieve and can continuously and automatically feed to the calciner.

The Na-type molecular sieve can be commercially available or can be prepared according to the known method. The known preparation method generally comprises gel synthesis, crystallization, filtering (the used filter is called as the first filter in the present invention, and is preferably a vacuum belt filter), and optionally drying (the used dryer is called as the second dryer in the present invention) to produce a Na-type molecular sieve.

The calciner is for heating the molecular sieve so that the temperature and the solid content of the molecular sieve can satisfy the requirement. Any existing device that may satisfy the object can be used as the calciner. For example, an existing continuous calciner such as a rotary calciner can be used if the object for calcining the molecular sieve can be accomplished. Since the gas-phase ultra-stabilization reactor of the present invention is used in the reaction, it is easy to communicate the continuous calciner with the gas-phase ultra-stabilization reaction apparatus. Preferably, the calcination temperature is 200-650° C., preferably 300-600° C. The calcination time is generally not less than 0.5 hour, e.g. 0.5-10 hour.

Figure 9:
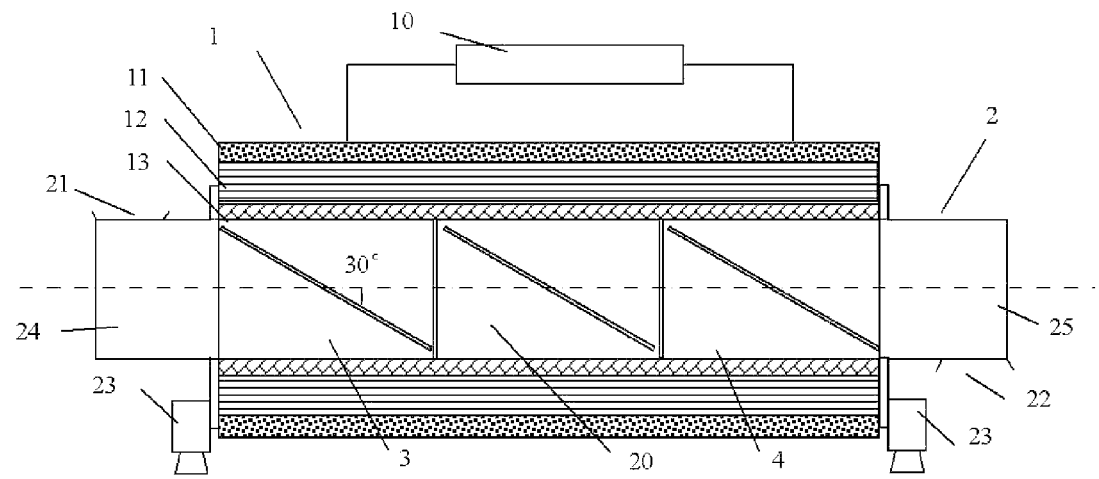
FIG. 9 shows a new calciner for the molecular sieve according to the present invention.

Preferably, a new calciner, as shown in FIG. 9, is used in the present invention. The calciner comprises a barrel 2 and a heating device 1 for heating the calciner's barrel. The calciner's barrel 2 comprises an inlet part 24, an intermediate barrel 20 and an outlet part 25. An inlet 21 and an outlet 22 are provided on the inlet part 24 and on the outlet part 25 respectively. The seizing plate 3 and the dam plate 4 are provided on the inner wall of the intermediate barrel 20. The angle between the extension direction of the seizing plate 3 from the molecular sieve inlet to the molecular sieve outlet of the calciner and the axis direction of the intermediate barrel 20 (from the molecular sieve inlet to the outlet) is preferably an acute angle. The dam plate 4 is perpendicular to the axis of the intermediate barrel 20. The intermediate barrel 20 is rotatable. The inlet part 24 and the outlet part 25 are fixed. In operation, the intermediate barrel 20 rotates, the molecular sieve to be calcined is added at the inlet 21, and then the calcined molecular sieve is collected at the outlet 22. The angle between the extension direction of the seizing plate 3 and the axis direction of the intermediate barrel 20 is an acute angle or an obtuse angle, and two adjacent seizing plates 3 are not in contact. The number of the seizing plate 3 and the number of the dam plate 4 can be independently one or more than one. The numbers in FIG. 9 have the following meanings: 1—furnace; 10—temperature controller; 11—thermal insulation layer; 12—heating system; 13—furnace tank; 2—barrel; 20—intermediate barrel; 21—inlet; 22—outlet; 23—connection and rotation mechanism; 24—inlet part; 25—outlet part; 3—seizing plate; 4—dam plate. "30°" shown in FIG. 9 is an illustration of the angle between the seizing plate and the axis, and not a limitation to the angle. The new calciner can make the discharging time of the molecular sieve more uniform, and facilitate the direct communication with the gas-phase ultra-stabilization reactor. The intermediate barrel can rotate in an anticlockwise direction or in a clockwise direction, both of which can make the discharging more uniform. It is preferable that the rotation direction of the calciner is identical to the direction in which the seizing plates extend along the circumstance of the intermediate barrel from the molecular sieve inlet to the molecular sieve outlet.

The calciner and the gas-phase ultra-stabilization reactor can be communicated by means of a molecular sieve convey pipeline. The molecular sieve outlet of the calciner is above the molecular sieve inlet of the gas-phase ultra-stabilization reactor. In order that the molecular sieve can be more smoothly moved from the outlet of the calciner to the inlet of the gas-phase ultra-stabilization reactor, at least one segment of the molecular sieve convey pipeline should be inclined. The angle between the axis of the inclined segment and the horizontal plane can be 35-75°. In order to facilitate controlling the flow rate of the molecular sieve, the communication pipeline can be provided with valve(s) or paddle(s) to regulate the size of the molecular sieve convey channel. When valve(s) or paddle(s) are used, the angle between the inclined segment and the horizontal plane can be 55-65°. This facilitates controlling the flow rate of the molecular sieve. By controlling the opening of valve(s) or paddle(s), in case that the molecular sieve forms a certain molecular sieve layer thereon, the flow of the molecular sieve can be guaranteed. This can isolate the gas flow between the gas-phase ultra-stabilization reactor and the calciner, and prevent the gaseous tetrachlorosilane from coming into the calciner upon fluctuation.

Figure 10:
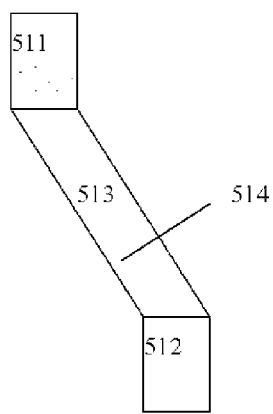
FIG. 10 shows a connection device for communication between the calciner and the gas-phase ultra-stabilization reactor according to the present invention.

One example of the communication pipeline preferably comprises a first vertical segment, a second vertical segment and an inclined segment. As shown in FIG. 10, an end of the first vertical segment 511 is connected to the molecular sieve outlet of the calciner, and the other end is connected to an end of the inclined segment 513; the other end of the inclined segment 513 is connected to an end of the second vertical segment 512; the other end of the second vertical segment 512 is connected to the molecular sieve inlet of the gas-phase ultra-stabilization reactor. The angle between the axis of the inclined segment and the horizontal plane is preferably 30-80°. The communication pipeline is preferably provided with a paddle 514. By providing the paddle, on one hand, the flow rate of the molecular sieve can be controlled, and on the other hand, the level of the molecular sieve in the communication pipeline can be controlled, which has a blocking function and prevents tetrachlorosilane from coming into the calciner. As shown in FIG. 10, if the paddle is moved toward upper right, the increase in the flow channel can increase the flow rate of the molecular sieve or decrease the level of the molecular sieve on the paddle. Contrarily, if the paddle is moved toward lower left, the flow rate of the molecular sieve can be decreased or the level of the molecular sieve on the paddle can be increased.

Figure 8:
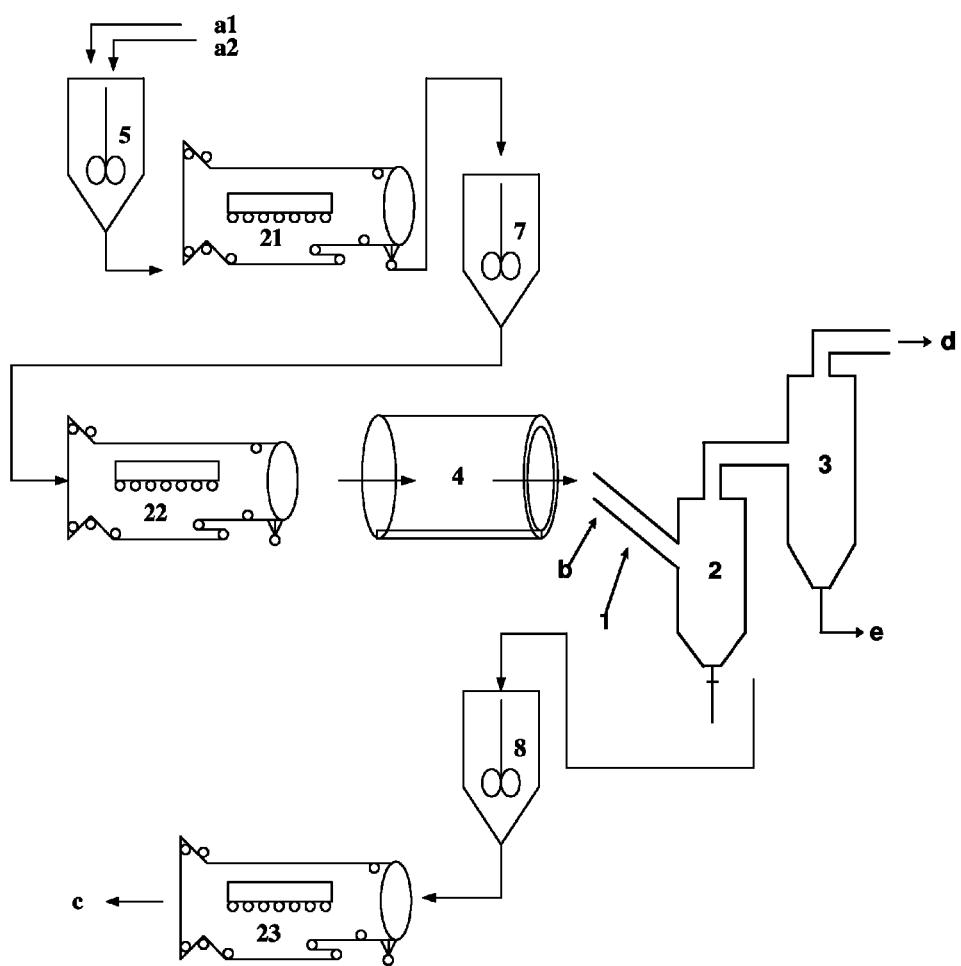
FIG. 8 shows a structure illustration of the device for preparing the molecular sieve according to the present invention.

A process flow for preparing the molecular sieve with the present apparatus is shown in FIG. 8. Starting materials for synthesizing a Na-type molecular sieve, such as silica-alumina template (a1) and a mixture (a2) of sodium aluminate, sodium silicate, sodium hydroxide and water are added to a synthesis vessel 5 and crystallized to produce a crystallization synthesis product comprising the Na-type molecular sieve and a synthesis mother liquor. Then the product is introduced to a belt filter 21 for filtering. The resulting filter cake and an exchanging liquor such as a rare-earth chloride solution are added to an exchanging drum 7 and mixed into slurry. Meanwhile, a slurry in the exchanging drum is discharged from the bottom of the exchanging drum, and introduced to a belt filter 22 for filtering. The resulting molecular sieve filter cake is introduced to a calciner 4 for calcining. After calcination, a molecular sieve of 200-600° C. is obtained. The resulting molecular sieve has a solid content of not less than 98 wt %. The molecular sieve and a heated gaseous $SiCl_4$ (b) as starting material are respectively fed to the tube reactor 1 from the molecular sieve inlet and the tetrachlorosilane inlet. The molecular sieve is moved by a conveyor device in the tube reactor 1 and contacted with the gaseous $SiCl_4$. The tube reactor 1 is heated by heater(s) provided on the outer wall of the tube body or in the tube body to ensure that the reaction temperature in the tube reactor 1 can be 250-700° C. Then, the resulting mixture is introduced to the gas-solid separator 2. In the gas-solid separator 2, the molecular sieve is settled onto the bottom of the gas-solid separator 2, and is discharged directly or at regular intervals. The molecular sieve is added to a washing drum 8 together with water. The resulting mixture is filtered with a belt filter 23 to produce a high silica molecular sieve (c). The unreacted gaseous SiCl$_4$, separated from the molecular sieve, is introduced to the absorber 3 via the outlet at the top of the gas-solid separator 2, and contacted with an alkaline liquor as absorbent in the absorber 3. The tail gas (d) is escaped from the alkaline liquor and discharged from the outlet at the top of the absorber 3. SiCl$_4$ is reacted with the alkaline liquor, and the resulting waste liquid (e) is discharged directly or at regular intervals via the outlet at the bottom.

According to a first embodiment of the present invention, the molecular sieve is conveyed by gravity. The tube body is a bent tube or a straight tube. The angle between the axis of the tube body and the horizontal plane is 30-90°. The tube body is placed in a vertical direction or in an inclined direction. The inclined the tube body facilitates controlling the reaction time of the molecular sieve in the tube body and facilitates controlling the moving of the molecular sieve. The straight tube is preferable. The cross-section is preferably round. The tube body is preferably inclined, and the angle between its axis and the horizontal plane is preferably 30-80°, e.g. 40-80°, or 40-70°. The preferred angle between the axis and the horizontal plane facilitates controlling the level of the molecular sieve in the reactor, and can fulfill the discharging of the molecular sieve, the smooth and stable operation, the stable quality of the molecular sieve product and the increased reaction depth of the dealumination and silicon insertion of the molecular sieve. A molecular sieve inlet and an optional tetrachlorosilane gas inlet are provided at one end of the tube body that is above the opposite end. The molecular sieve is settled by gravity after it comes into the tube body, and mixed and contacted with the tetrachlorosilane gas therein to conduct the ultra-stabilization reaction. The tetrachlorosilane gas on the whole moves towards the molecular sieve outlet. The tetrachlorosilane concentration decreases in the axis direction of the reactor, as the reaction goes on. The residual tetrachlorosilane gas is discharged from the reactor at the molecular sieve outlet. The molecular sieve outlet is provided at another end of the tube body, i.e. at one end of the tube body that is below the opposite end. In order to reduce the size of the reactor, it is preferable according to the present invention that the molecular sieve is deposited in the lower part of the tube body and gradually moved, and the level of the molecular sieve deposited onto the bottom is controlled by managing the resistance at the outlet, for example, providing a necking down, a paddle or a valve at the outlet, so that the reaction time of the deposited molecular sieve can be controlled. During the settlement of the molecular sieve, the molecular sieve is contacted and mixed with the tetrachlorosilane gas. Then the molecular sieve is accumulated in the lower part of the tube body. The tetrachlorosilane gas mixes into the interstices and pores of the molecular sieve particles. This part of the tetrachlorosilane gas moves toward the molecular sieve outlet together with the molecular sieve, and the ultra-stabilization goes on. The tetrachlorosilane gas is gradually consumed. Then the unreacted tetrachlorosilane gas and the molecular sieve are discharged from the tube body at the molecular sieve outlet and introduced to the gas-solid separator, where the ultra-stabilized molecular sieve and the entrained gas are separated from each other. The gas is introduced to the absorber to absorb the tetrachlorosilane gas and the molecular sieve is collected at the bottom of the gas-solid separator and discharged directly or at regular intervals from the gas-solid separator. The upper part of the tube body is a settlement zone for the molecular sieve, where the tetrachlorosilane gas is in the gas phase. Therefore, during the settlement of the molecular sieve, the ultra-stabilization between the molecular sieve and the tetrachlorosilane gas begins. Then the molecular sieve is deposited in the lower part of the reactor, and is moved towards the molecular sieve outlet, while the ultra-stabilization goes on. With the moving of the molecular sieve, the tetrachlorosilane gas in the interstices and pores of the molecular sieve particles gradually reacts. By controlling the height of the reactor, the height of the settlement zone, and the height of the accumulation layer, the reaction time can be controlled, so that the tetrachlorosilane gas in the interstices and pores of the molecular sieve particles can be reacted as completely as possible. Since the formed accumulation layer has a relatively higher resistance, it can prevent the introduced tetrachlorosilane gas from directly coming through the molecular sieve accumulation layer into the gas-solid separator in case of the large pressure fluctuation, which can help to increase the utility of the tetrachlorosilane gas and decrease the used amount of the tetrachlorosilane gas. Therefore, it is preferable that at least a part of the cross-section of the reactor is full of the molecular sieve, which can prevent the tetrachlorosilane gas from directly coming from the outlet into the gas-solid separator due to the pressure fluctuation. Therefore, the size of the reactor can be reduced, and the reaction effect can be guaranteed. The reactor can be also provided with a dam plate. The molecular sieve is fed to the tube body at one end of the tube body that is above the opposite end, and the tetrachlorosilane gas is fed at the same end to the tube body and contacted with the molecular sieve. The molecular sieve is moved towards the other end of the tube body along the tube body. In this case, the molecular sieve is accumulated in the tube body, and moved by gravity towards an end of the tube body that is below the opposite end. There are the tetrachlorosilane gas and the gas entrained by introducing the molecular sieve to the tube body in the interstices of the molecular sieve particles, and these gases are moved together with the molecular sieve. The molecular sieve outlet is located at one end of the tube body that is below the opposite end, and it can be in the end surface of the tube body, or in the tube wall close to the end surface. Preferably, the tube body of the reactor is a round tube with an inner diameter of 0.1-2 meters, more preferably 0.15-1.5 meters. The reactor has a length to diameter ratio (a ratio of the length to the inner diameter of the tube body) of greater than 1, generally 1-500, e.g. 1.5-400:1, preferably 3-150:1, e.g. 10-100:1.

According to a second embodiment of the present invention, the reactor is a tube reactor. The tube reactor conveys the molecular sieve by gravity. In order to facilitate controlling the moving of the molecular sieve in the tube body, make the moving of the molecular sieve more smooth and stable, and improve the reaction effect, the tube body of the tube reactor is provided as being rotatable, i.e. a part of or all of the tube body of the tube reactor can be provided as being rotatable around the axis of the tube body. Generally, the rotatable part of the tube reactor (i.e. the tube body configured as being rotatable around the axis of the tube body) comprises 20% or more, 20%-100%, or 20-90% of the length of the tube body of the reactor. The rotation can remarkably increase the contact between the molecular sieve and SiCl$_4$, which makes the ultra-stabilization of the molecular sieve more smooth and stable, and makes the product quality more stable. In this case, the molecular sieve inlet is preferably above the molecular sieve outlet; preferably, the axis of the tube body can form an angle α (an acute angle) relative to the horizontal plane. The angle can be 5-90°, preferably 5-70°, e.g. 10-20°, 20-50°, 30-40°, 40-60° or 60-70°, and more preferably 30-55°. The inclined tube body can facilitate controlling the reaction time of the molecular sieve in the tube body and controlling the moving of the molecular sieve, can promote the mixing of tetrachlorosilane and the molecular sieve, and can increase the uniformity of the reaction. The tube body of the tube reactor is preferably a straight tube. Preferably, the molecular sieve and tetrachlorosilane are in a parallel flow. In case that a part of or all of the tube body is provided as being rotatable, the rotation speed of the tube body is 0.05-40 rpm, preferably 0.5-25 rpm, e.g., 0.5-15 rpm. In case that the tube body is rotatable, various forms of seizing plate(s) and baffle plate(s) can be provided inside the tube body. The seizing plate and the baffle plate can sufficiently mix the molecular sieve and $SiCl_4$. The baffle plate is also called as dam plate, and can prevent the molecular sieve from quickly sliding (resulting in a significant fluctuation of the product quality) and avoid that a part of the molecular sieve quickly passes through the reactor. The seizing plate can promote the mixing of the molecular sieve and the tetrachlorosilane gas. The seizing plate(s) can be welded inside the tube body in a straight line, either in parallel with the axis of the tube body or at a certain inclination angle (i.e. at a certain angle relative to the axis of the tube body), or can be welded in a screw pattern, in a wave pattern or in other patterns. The seizing plate number can be one or more than one. Generally, one seizing plate may be enough, and 1-6 seizing plates are preferable (the seizing plate number refers to the number relative to the cross-section). The width of the seizing plate can be for example $1/100$-$1/10$, e.g. $1/30$-$1/10$ of the inner diameter of the tube body. Small steel plate(s) that can strengthen the mixing of the molecular sieve, in any shape and in any amount, can be installed on the seizing plate to strengthen the stirring and enhance the effect of mass transfer. The small steel plate can be in a linear form, a screw form, a wave form, a round form or a combination thereof. The baffle plate can be evenly or unevenly welded inside the tube body. The baffle plate number can be zero, or one or more than one. The width of the baffle plate can be determined according to the predetermined amount of the molecular sieve fed to the tube body. For example, the width of the baffle plate can be $1/100$-$1/10$ of the inner diameter of the tube body. The object of the baffle plate is to alleviate or eliminate the sliding of the molecular sieve in the reactor, for example, alleviate or eliminate the condition that the velocity of the lower layer is greater than the velocity of the upper layer, so that the reaction can be more uniform and the used amount of tetrachlorosilane can be reduced. The angle $\alpha$ is preferably 30-50°, which not only can ensure conveying the molecular sieve in the tube body, but also is favorable for stabilizing the product quality.

In case that a part of or all of the tube body is provided as being rotatable, the tube body preferably comprises an inner tube, which is favorable for increasing the concentration of tetrachlorosilane in the reactor, increases the extent of reaction, decreases the consumption of tetrachlorosilane, and promotes the mass transfer. The inner tube can be coaxial with the tube body. The inner tube can be a round tube. The outer diameter of the inner tube is preferably $1/4$-$3/4$ of the inner diameter of the tube body. Preferably, the rotatable tube body is provided with an inner tube.

Figure 3:
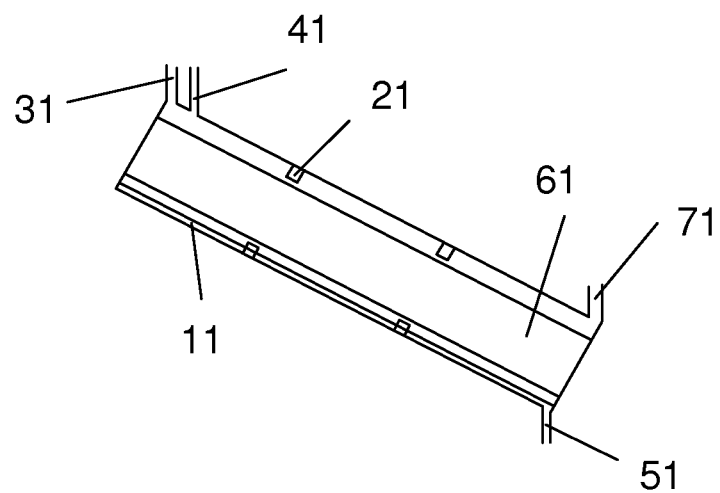
FIG. 3 shows a structure illustration of the tube reactor according to Example 2.
Figure 4:
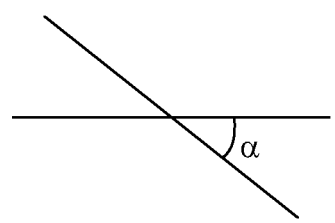
FIG. 4 shows an illustration of the angle α between the axis and the horizontal plane of the tube reactor 1 as shown in FIG. 2.

According to the second embodiment of the present invention, a gas-phase ultra-stabilization reactor is shown in FIG. 3. The gas-phase ultra-stabilization reactor comprises a tube body of the reactor, a molecular sieve inlet 31, a gaseous tetrachlorosilane inlet 41, a molecular sieve outlet 51, an inner tube 61 and a gas outlet 71. A seizing plate 11 and a baffle plate 21 can be provided in the tube body of the reactor. The reactor can further comprise a rotation driving mechanism for the tube body (not shown). Tetrachlorosilane and the molecular sieve are respectively introduced via the tetrachlorosilane inlet 41 and the molecular sieve inlet 31 to an annular space between the inner tube 61 and the tube wall of the gas-phase ultra-stabilization reactor, and contacted and reacted. The seizing plate 11 can make the molecular sieve tumble in the tube body, which is favorable for mixing the molecular sieve and tetrachlorosilane. The baffle plate 21 can prevent the molecular sieve from sliding down the tube wall of the reactor, which is favorable for making the molecular sieve move smooth and stable, preventing the lower molecular sieve from moving faster than the upper molecular sieve, and stabilizing the product quality. The introduction of the inner tube 61 makes the molecular sieve react in the annular space, which is favorable for stabilizing the molecular sieve quality, and reducing the heat loss. The gas-solid separator is for collecting the molecular sieve after contacting with the $SiCl_4$ gas.

According to a third embodiment of the present invention, the reactor utilizes a kinetic force conveying device to convey the molecular sieve, and move the molecular sieve in the reactor. The kinetic force conveying device can be any device, provided that it can make the molecular sieve and the gaseous $SiCl_4$ continuously move and react in the reactor. The device can be for example a reciprocating piston conveyor, a tube chain conveyor, a screw conveyor, a tube belt conveyor, a tube gravity conveyor, a belt conveyor or a combination thereof. By using a kinetic force conveying device, the molecular sieve can be moved in the tube reactor, and the gas in the interstices and pores of the molecular sieve particles can also move to the outlet of the gas-phase ultra-stabilization reactor along together with the molecular sieve.

One example is that the molecular sieve is conveyed with a tube belt conveyor. For the tube belt conveyor, a belt conveyor is installed inside a closed tube reactor. The molecular sieve and the gaseous $SiCl_4$ fall onto the belt conveyor from an upper inlet at one end of the tube reactor, and are moved to a lower outlet at the other end of the tube reactor with the belt conveyor. On the belt conveyor, the reactants can sufficiently react. The belt conveyor can be any conveyor that is conventionally used. The length and the width of the belt conveyor depend on the positions of the inlet and the outlet of the tube reactor and the feeding amount of the molecular sieve. Preferably, the thickness of the molecular sieve on the belt conveyor is not more than 20 cm, preferably not more than 10 cm. In case that the molecular sieve is moved with a belt convey device, the angle $\alpha$ between the axis of the tube body and the horizontal plane is 0-45°, preferably 0-25°.

Figure 5:
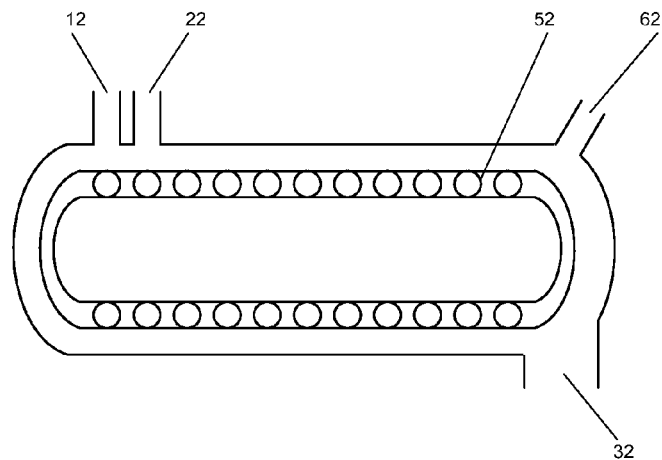
FIG. 5 shows a structure illustration of the tube reactor as mentioned in Example 1.

A reactor with a belt convey device to move the molecular sieve is shown in FIG. 5. The molecular sieve feedstock and tetrachlorosilane are introduced to the reactor from the molecular sieve inlet end 12 and the tetrachlorosilane inlet 22 at one end of the reactor. The molecular sieve particles fall onto a belt convey device 52 and are moved by the conveyor on the belt convey device 52. The space over the molecular sieve is full of tetrachlorosilane, which diffuses into the interstices and then the pores of the molecular sieve particles to take part in the ultra-stabilization reaction of dealumination and silicon insertion. The molecular sieve after reaction falls to the outlet 32 at the other end of the reactor and is discharged from the reactor. Due to the reaction with the molecular sieve, the concentration of the gaseous tetrachlorosilane gradually decreases in the moving direction of the molecular sieve. The opening degree of the outlet 32 can be controlled, so that the molecular sieve is discharged at a certain rate. The molecular sieve can be accumulated by a certain height at the outlet 32 so as to prevent an excessive amount of tetrachlorosilane from being discharged from the outlet 32. The gas outlet 62 is for drawing off the tetrachlorosilane and the air entrained with the molecular sieve from the reactor. In this way, due to the squeezing effect of tetrachlorosilane, the air entrained with the molecular sieve into the reactor can diffuse into the upper gas layer from the interstices of the molecular sieve particles under the effect of tetrachlorosilane. By drawing off the gas in the upper gas layer at regular or irregular intervals, the reaction can be conducted smoothly and stably. The gas drawn off from the gas outlet 62 can be cooled to recover tetrachlorosilane. The non-cooled gas can be vented after being absorbed to remove a small amount of tetrachlorosilane therein. Usually, the thickness of the molecular sieve on the conveyor should not be too large, preferably not more than 10 cm, e.g. not more than 5 cm.

For the mechanical convey, a reciprocating piston conveyor can be used to move the molecular sieve. The reciprocating piston conveyor is a circulating convey device that is formed with multiple piston pushing rods and installed in a closed tube reactor. The tube reactor is divided into the upper layer and the lower layer. The upper layer is a space for pushing the molecular sieve and the gaseous $SiCl_4$ coming from the upper inlet of the tube reactor forward by the piston rods, and the lower layer is a space that is provided for the piston rods themselves to move backward. In this way, a circulation reaction system with a continuous feeding is formed.

For the mechanical convey, it can be preferable to use a tube chain conveyor to move the molecular sieve. The tube chain conveyor comprises sprocket wheel(s), rim wheel(s), chains, disk(s), a circulating convey tube, an inlet and an outlet, wherein chains are assembled on the sprocket wheel(s) and the rim wheel(s); disk(s) are perpendicularly inserted in revolving chains; the circulating convey tube is assembled outside the chains; and sprocket wheel(s), rim wheel(s), chain(s), disk(s) and the circulating convey tube form a closed material convey loop. By setting the tetrachlorosilane inlet close to the molecular sieve inlet, the moving direction of tetrachlorosilane and the moving direction of the molecular sieve can be substantially identical. The ratio of the distance between chains of the tube chain conveyor to the inner diameter of the reaction tube can be 1: 1-1:100, e.g. 1:2-1:20. The ratio of the distance between adjacent disk(s) to the inner diameter of the tube body of the reactor is less than one, preferably ¼-½.

In the gas-phase ultra-stabilization reactor, it can be also preferable to use a screw conveyor to move the molecular sieve. The screw conveyor comprises a shafted screw conveyor and a shaftless screw conveyor. The shaftless screw conveyor has no center shaft and utilizes an integrated steel-made screw having a certain flexibility to move the substance. Therefore, it has a strong anti-entangling performance and no disturbance caused by the center shaft. The shafted screw conveyor is a continuous conveying device, which utilizes the rotation of screw steel disk to move the substance. This kind of conveying device can be placed in a horizontal state or in an inclined state. There is no special requirement for the screw pitch of the screw conveyor, provided that it can make the molecular sieve move in the tube body. For example, the screw pitch can be ¹⁄₁₀₀-¹⁄₁₀ of the inner diameter of the tube bodywork.

Preferably, the tube body of the gas-phase ultra-stabilization reactor is a straight tube. The molecular sieve can occupy the circumstance of the tube body for at least one site of the reactor. That is to say, for at least one site of the tube reactor, the cross-section of the tube body is full of the molecular sieve. In this way, the molecular sieve may have a sealing function so that the tetrachlorosilane gas will not flow to the gas-solid separator too quickly due to the pressure fluctuation.

According to a fourth embodiment of the present invention, the conveying of the molecular sieve can also be conducted by the combination of the kinetic force and the gravity. It is called herein as "the combined conveying manner". In this case, the moving of the molecular sieve is controlled by gravity and by a mechanical conveying device. By controlling the mechanical conveying device, the residence time of the molecular sieve in the reactor can be adjusted, and the reaction time of the molecular sieve and tetrachlorosilane can be controlled. In this manner, the reaction of the molecular sieve in the tube reactor can become more uniform, and the back-mixing can be reduced. In the combined conveying manner, the preferable tube reactor is a straight tube reactor, and the angle between the axis of the tube body and the horizontal plane is preferably 25-55°. In this way, not only the gas-phase ultra-stabilization reaction for the dealumination and silicon insertion of the molecular sieve can be accomplished, but also the force to the mechanical conveying device can be relatively small, which facilitates controlling the moving of the molecular sieve in the reactor, makes the reaction more uniform and has a benefit of reducing the device maintenance. The preferable mechanical conveying device is for example a reciprocating piston conveyor, a tube chain conveyor, a screw conveyor, and a belt conveyor. Preferably, the tube body is configured in an inclined state. The angle between the axis of the tube body and the horizontal plane is preferably 25-55° C., which can enhance the stability of the prepared molecular sieve and improve the product distribution.

The present invention further comprises a gas-solid separation step and an absorption step, and therefore the apparatus of the present invention further comprises a gas-solid separator and an absorber. The gas-solid separation is for separating the molecular sieve after reaction from the unreacted tetrachlorosilane in the gaseous phase, and remove the unreacted tetrachlorosilane in the molecular sieve as much as possible. The gas-solid separation can be conducted in the gas-solid separator. The absorption is for absorbing tetrachlorosilane in the gas resulting from the gas-solid separation, and can be conducted in the absorber. Various vessels that can accomplish the above gas-solid separation object can be used as the gas-solid separator of the present invention. The present invention may have no specific limitation to the shape of the gas-solid separator. For example, the gas-solid separator can be in a cylindric shape. Furthermore, in a preferable manner, the lower part of the gas-solid separator is a cone having an opening at its end. Accordingly, the obtained molecular sieve can be discharged from the opening. In order that the gas components in the mixture after the reaction can come into the absorber as much as possible, rather than being discharged from the above opening, it is preferable that the connection point of the gas-solid separator and the (reactor) outlet is above the starting point of the cone. More preferably, the connection point of the gas-solid separator and the (reactor) outlet is located at the middle-upper part of the gas-solid separator. The gas-solid separator is communicated via its top opening with the absorber as described hereinafter.

In the gas-solid separator, the solid molecular sieve is separatd from the gas to produce a high silica molecular sieve product. The gas-solid separator generally comprises an inlet and a top gas outlet. One end of the tube body is communicated with the gas-solid separator. The cross-section area of the gas-solid separator is greater than the cross-section area of the tube body of the tube reactor, which can accomplish the settlement of the molecular sieve powder after reaction so as to finish the gas-solid separation. The cross-section area of the gas-solid separator is larger than the cross-section area of the tube body of the tube reacto, which can accomplish the molecular sieve powder after reaction to settle by gravity, an therefore accomplish the gas-solid separation. Further preferably, the ratio of the cross-section area of the gas-solid separator to the cross-section area of the tube body of the tube reactor is 2-10:1, which can accomplish the fast settlement of the molecular sieve. In order to further guarantee the molecular sieve sufficiently settles into the gas-solid separator, it is preferable according to the present invention that the height of the gas-solid separator is not less than 5 meters, e.g. 5-10 meters. More preferably, the inlet of the gas-solid separator is located at the middle of the gas-solid separator, on one hand, which can guarantee no agitation is the molecular sieve settled on the bottom of the gas-solid separator, and on the other hand, which can guarantee a sufficient settlement time. The reactor and the gas-solid separator can be configured as being operated in a small negative pressure, e.g. the vacuum degree of the gas-solid separator can be 100 Pa-90 kPa, preferably 1 kPa-80 kPa.

Further preferably, the gas-solid separator further comprises a bottom solid outlet, which is for discharging the molecular sieve solid resulting from the separation. More preferably, the gas-solid separator further comprises valve(s) for controlling the opening and the closing of the bottom solid outlet, so that the molecular sieve solid collected in the gas-solid separator can be discharged at a good time.

The molecular sieve discharged from the gas-solid separator can be directly mixed with matrix and water into slurry without being washed. Since the gas-phase ultra-stabilization reaction is a dealumination and silicon insertion process, the reaction process will produce a large amount of aluminum chloride. Meanwhile, the starting material of the reaction comprises tetrachlorosilane. The contact of tetrachlorosilane and water will immediately produce silica gel and hydrochloric acid. After the completion of the reaction, the molecular sieve will carry some tetrachlorosilane and aluminum chloride, which may be used as binder in the gel formation of the catalyst. This can reduce the use of binder in the preparation of catalyst and also reduce the generation of waste water, solid waste, and acidic gas, and therefore reduce the environment pollution to a large extent and enhance the recovery and utility of the waste. The present process can shorten the catalyst preparation procedure, reduce the amount of water for washing the molecular sieve, reduce the loss of rare-earth during the washing of the molecular sieve, increase the rare-earth utility by reusing the rare-earth ions in the slurry into the catalyst preparation, and utilize the starting materials in a high efficiency.

The molecular sieve discharged from the gas-solid separator can also be washed. The washing can be conducted according to the existing method. For example, the washing can be conducted with decationized water or deionized water. Usually, the washing is conducted in such an extent that the washed molecular sieve has a Na2O content of not higher than 0.5 wt %, then the molecular sieve resulting from the washing is mixed with matrix to form a slurry. The slurry is then spray-dried.

According to the present invention, the gas from the gas outlet of the gas-solid separator is subjected to absorption to remove tetrachlorosilane contained therein. As shown in FIGS. 2a, 2b and 8, the absorption is preferably conducted in the absorber 3. The absorbent is held in the absorber 3 and is used to absorb the unreacted $SiCl_4$ until the gas satisfies the emission standard. The absorber 3 is for absorbing the unreacted $SiCl_4$, so that the gas from the gas-solid separator 2 can satisfy the emission standard. As the absorber 3, a variety of absorbers that are conventionally used in the art can be used, provided that it can absorb $SiCl_4$. In general, $SiCl_4$ is absorbed with an alkaline liquor such as an aqueous sodium hydroxide solution, or is absorbed with water. In the present invention, the absorber 3 preferably comprises a gas inlet, an absorbent liquid inlet and two outlets, wherein the gas inlet communicates with the gas-solid separator, and is preferably located at the middle-upper part of the absorber. Two outlets are respectively located at the top and the bottom of the absorber, and are respectively for emitting the gas and absorbing the waste liquid. In order to guarantee the content of $SiCl_4$ in the emitted gas is low enough, it is preferably that multiple absorbers are connected in series. Multiple absorbers in series form a multistage absorption of $SiCl_4$. The gas outlet of the absorber can be connected to an induced draft fan.

The gas-phase ultra-stabilization reactor of the present invention can also comprise a heater for heating the contents in the reactor. A heater can be implemented in a commonly used heating manner. A variety of heaters can be used. For example, the heating belt is wrapped on the outer wall of the reactor; the electric furnace heating wire is installed on the outer wall of the reactor; or the reactor is heated with steam/heated with spiral coil in the reactor/heated by heat radiation/heated by microwave. Preferably, in the present invention, the heater can be one or more of an electric heating belt, a steam jacket and a spiral heater installed at the molecular sieve inlet, at the tetrachlorosilane inlet, at the outer wall of the tube body and/or inside the tube body. A heat-exchanger can also be implemented in a commonly used heat-exchanging manner. For example, the solid $SiCl_4$ can be heat-exchanged with steam or other vapors. The temperature of the contents in the tube reactor can be controlled by installing the heater, and therefore the requirement for the feeding temperature of the molecular sieve can be reduced. Moreover, according to the requirement for the final dealumination and silicon insertion molecular sieve, the temperatures at different portions from the inlet to the outlet in the tube reactor can be controlled to the same or different levels. No heater can be installed, and the temperatures of the contents in the reactor can be adjusted with the reaction heat of the molecular sieve and $SiCl_4$. For example, adjusting the ratio of the feeding amounts of the molecular sieve to $SiCl_4$ can simplify the process flow. The molecular sieve products with different dealumination depth can be obtained by controlling the different contact temperatures of the molecular sieve and the gaseous $SiCl_4$.

In order to be able to control the temperature in the tube reactor more accurately, preferably, the heater is an electric heater, such as an electric heat tape (multiple electric heat tapes) or an electric furnace heating wire. Meanwhile, the tube body is divided into multiple stages, and one electric heat tape or an electric furnace heating wire is wrapped on the outer wall of each stage of the tube body. In this way, temperature measuring devices can be respectively installed inside the tube body. According to the temperature requirement for the dealumination and silicon insertion reaction and each of the temperature measuring device, the actual temperature in each stage of the tube body can be measured. By controlling the current and the voltage of the electric heat tape wrapped on the outer wall of each stage of the tube body, the temperature in each stage of the tube body can be controlled. For example, the length of each stage of the tube body can be 2-20 meters, preferably 2-8 meters.

The control of the contact temperature of the molecular sieve and the gaseous $SiCl_4$ can be independent from the temperature of the molecular sieve that comes into the reactor and the temperature of the gaseous $SiCl_4$. The temperatures of the molecular sieve and the gaseous $SiCl_4$ can be arbitrary. In order that the reaction can proceed quickly after the contact of the molecular sieve and the gaseous $SiCl_4$, it is preferable that the temperature of the molecular sieve that is introduced into the gas-phase ultra-stabilization reactor is 200-600° C., and the temperature of $SiCl_4$ is 60-150° C. Since the temperature of the calcined molecular sieve is generally 300° C. or more, the above temperature of the molecular sieve can be obtained at the beginning of the reaction by combining the reactor and the calciner. That is to say, preferably, the molecular sieve is the one just discharged from the calciner. On one hand, this can utilize the high temperature of the molecular sieve after the calcination as the heat source for the dealumination and silicon insertion reaction to start the dealumination and silicon insertion reaction, and therefore the energy can be saved; on the other hand, this can shorten the time for heating the molecular sieve, and therefore the reaction can be sufficiently conducted in a relative short time.

The present process will be further explained with reference to FIG. 2a. The molecular sieve (a) having a temperature of 200-600° C. and the heat-exchanged gaseous $SiCl_4$ (b) as starting materials are respectively introduced to the tube reactor 1 (the reactor can be optionally provided with a heater). The molecular sieve and the gaseous $SiCl_4$ are contacted and reacted in the tube reactor 1, and moved towards the molecular sieve outlet. The tube reactor 1 can be heated by a heater installed on the outer wall of the tube body and/or inside the tube body to adjust the reaction temperature in the tube reactor 1 to be 250-700° C. Then the reaction mixture is introduced to the gas-solid separator 2. In the gas-solid separator 2, the high silica molecular sieve (c) obtained from the reaction settles onto the bottom of the gas-solid separator 2, discharged directly or at regular intervals, and then introduced to the slurry mixer 4 to mix with the matrix such as the binder and the clay to form a slurry. The obtained slurry is introduced to a particle forming device such as a spray-dryer to form the catalyst particles. The gaseous $SiCl_4$ is introduced to the absorber 3 via the outlet at the top of the gas-solid separator 2, and contacted with an absorbent such as an alkaline liquor in the absorber 3. The tail gas (d) is escaped from the alkaline liquor, and discharged from the outlet at the top of the absorber 3. $SiCl_4$ is reacted with the alkaline liquor, and the waste liquid (e) is discharged via the outlet at the bottom directly or at regular intervals.

The present process will be further explained with reference to FIG. 2b. The molecular sieve (a) having a temperature of 200-600° C. and the heat-exchanged gaseous $SiCl_4$ (b) as starting materials are respectively introduced to the tube reactor 1 (the reactor can be optionally provided with a heater). The molecular sieve and the gaseous $SiCl_4$ are contacted and reacted in the tube reactor 1, and moved towards the molecular sieve outlet. The tube reactor 1 can be heated by a heater installed on the outer wall of the tube body and/or inside the tube body to adjust the reaction temperature in the tube reactor 1 to be 250-700° C. Then the reaction mixture is introduced to the gas-solid separator 2. In the gas-solid separator 2, the high silica molecular sieve (c) obtained from the reaction settles onto the bottom of the gas-solid separator 2, discharged directly or at regular intervals, introduced to the washer 4 for washing, then introduced to a filtering/drying unit 6 for filtering and drying, then introduced to the slurry mixer 5, and mixed with the matrix (g) that is introduced to the slurry mixer 5 to form a slurry. The obtained slurry is introduced to a particle forming device such as a spray-dryer to form the catalyst particles. The unreacted gaseous $SiCl_4$ is introduced to the absorber 3 via the outlet at the top of the gas-solid separator 2, and contacted with an absorbent such as an alkaline liquor in the absorber 3. The tail gas (d) is escaped from the alkaline liquor, and discharged from the outlet at the top of the absorber 3. $SiCl_4$ is reacted with the alkaline liquor, and the waste liquid (e) is discharged via the outlet at the bottom directly or at regular intervals.

The present process will be further explained with reference to FIG. 8. The crystallization synthesis product from the crystallization synthesis vessel 5 is introduced to the vaccum belt filter 21 for filtering. The molecular sieve filter cake is introduced to the exchanging drum 7 through the top of the exchanging drum 7, mixed with an exchanging liquor that is introduced in an exchanging ratio to the exchanging drum 7, and then exchanged in the exchanging drum 7. Meanwhile, a molecular sieve-containing slurry from the bottom of the exchanging drum is introduced to the vacuum belt filter 22 for filtering. The molecular sieve filter cake is introduced to the calciner 4 for calcining, and a molecular sieve having a temperature of 200-600° C., preferably 300-600° C. is obtained. The obtained molecular sieve and the heated gaseous $SiCl_4$ (b) as starting materials are respectively introduced to the tube reactor 1 (the reactor can be optionally provided with a heater). The molecular sieve and the gaseous $SiCl_4$ are contacted and reacted in the tube reactor 1, and moved towards the molecular sieve outlet. The tube reactor 1 can be heated by a heater installed on the outer wall of the tube body and/or inside the tube body to adjust the reaction temperature in the tube reactor 1 to be 250-700° C. Then the reaction mixture is introduced to the gas-solid separator 2. In the gas-solid separator 2, the high silica molecular sieve obtained from the reaction settles onto the bottom of the gas-solid separator 2, discharged directly or at regular intervals, introduced to the washing drum 8 for washing, then filtered through the vacuum belt filter 23 to obtain the high silica molecular sieve (c) with an increased Si/Al ratio (or not introduced to the washing drum 8 for washing, but directly introduced to a gel-forming device, mixed with other materials for preparing the catalytic cracking catalyst to form a slurry, and then shaped to the catalyst particles). The unreacted gaseous $SiCl_4$ is introduced to the absorber 3 via the outlet at the top of the gas-solid separator 2, and contacted with an absorbent such as an alkaline liquor in the absorber 3. The tail gas (d) is escaped from the alkaline liquor, and discharged from the outlet at the top of the absorber 3. $SiCl_4$ is reacted with the alkaline liquor, and the waste liquid (e) is discharged via the outlet at the bottom directly or at regular intervals.

The present invention can be used in the gas-phase dealumination and silicon insertion of various molecular sieves. For example, the molecular sieve can be a Y-type molecular sieve, and the Y-type molecular sieve may have a rare-earth content of 0-18 wt %, and a Si/Al ratio (SiO2/Al2O3 molar ratio) of 4-6.

The present invention can also be used in the gas-phase dealumination and silicon insertion of various Na-type molecular sieve. For example, the Na-type molecular sieve is a NaY molecular sieve. A mixture of a template agent for synthesizing the NaY molecular sieve, a silica-alumina gel and water is crystallized (the crystallization synthesis can be conducted according to the existing method, e.g. the method disclosed in CN101468804B). The crystallization product is filtered, and the resulting filter cake is optionally dried to obtain a NaY molecular sieve. The NaY molecular sieve is introduced to the ion-exchanging device and subjected to the ion-exchanging, and the NaY molecular sieves having different exchanging degrees can be obtained. The ion-exchanging can be conducted according to the existing method, for example, an ammonium salt and/or a rare-earth salt can be used in the ion-exchanging. The ammonium salt is for example one or more of ammonium chloride, ammonium nitrate, and ammonium sulfate, and the rare-earth salt is for example rare-earth chloride and/or rare-earth nitrate.

For example, the NaY molecular sieve can be exchanged with rare-earth or without rare-earth to obtain a Y-type molecular sieve with different rare-earth contents. The Y-type molecular sieve can have a rare-earth content of 0-18 wt %, and a Si/Al ratio ($SiO_2/Al_2O_3$ molar ratio) of 4-6. The molecular sieve obtained according to the present process can be used to prepare the catalytic cracking catalyst. Other starting materials such as matrix for preparing the catalytic cracking catalyst and the operation procedures can be well known to those skilled in the art. For example, the matrix can be used as one or more of binder and clay for preparing the catalytic cracking catalyst. For example, based on the total weight of the catalytic cracking catalyst, in the resulting catalyst, the content of the molecular sieve is 5-50 wt %, the content of the binder (as oxide) is 0.5-50 wt %, and the content of the clay is 5-90 wt %. The binder can be one or more of alumina, hydrated alumina, alumina sol, silica sol, silica-alumina gel, silica-alumina sol and a precursor thereof. The clay can be one or more of kaolin, metahalloysite, montmorillonite, diatomite, halloysite, saponite, rectorite, sepiolite, attapulgite, hydrotalcite, and bentonite. The methods of mixing into slurry and shaping into particles are conventional in the prior art, and the present invention will not go into much detail here.

The present invention also provides the following technical solutions:

a-1. A process for preparing a catalytic cracking catalyst, which process comprises: a molecular sieve is introduced into a gas-phase ultra-stabilization reactor, the molecular sieve is moved without the conveying of carrier gas from a molecular sieve inlet of the gas-phase ultra-stabilization reactor to a molecular sieve outlet of the gas-phase ultra-stabilization reactor, the molecular sieve is contacted and reacted with a gaseous $SiCl_4$ in the gas-phase ultra-stabilization reactor, the molecular sieve resulting from the contacting and the reacting is mixed with a matrix into slurry, and shaped into particles.

a-2. The process according to Solution a-1, wherein in the gas-phase ultra-stabilization reactor, the contact temperature of the molecular sieve and the gaseous $SiCl_4$ is 250-700° C., the residence time of the molecular sieve in the gas-phase ultra-stabilization reactor is 10 seconds to 100 minutes.

a-3. The process according to Solution a-1, wherein "being moved without the conveying of carrier gas from a molecular sieve inlet of the gas-phase ultra-stabilization reactor to a molecular sieve outlet of the gas-phase ultra-stabilization reactor" is accomplished by using belt conveyor, tube chain conveyor, screw conveyor, reciprocating piston conveyor, tube gravity conveyor or a combination thereof.

a-4. The process according to Solution a-1, wherein the gas-phase ultra-stabilization reactor comprises a molecular sieve inlet, a tetrachlorosilane inlet, a tube body of the reactor and a molecular sieve outlet, the molecular sieve inlet is above the molecular sieve outlet.

a-5. The process according to Solution a-1 or a-4, wherein the molecular sieve and the tetrachlorosilane have the same inlet, or the molecular sieve inlet and the tetrachlorosilane inlet are located at the same end of the gas-phase ultra-stabilization reactor.

a-6. The process according to Solution a-4, wherein the ratio of the length to the inner diameter of the reactor is larger than 1, preferably 3-100:1.

a-7. The process according to Solution a-1, wherein the gas-phase ultra-stabilization reactor comprises a molecular sieve inlet, a tetrachlorosilane inlet, a tube body of the reactor, and a molecular sieve outlet, the angle between the tube body of the reactor and the horizontal plane is 30-90°, the molecular sieve inlet is located at the upper end of the tube body, the molecular sieve outlet is located at the lower end of the tube body, the molecular sieve outlet is communicated with the gas-solid separation device, the distance between the tetrachlorosilane inlet and the molecular sieve inlet is larger than the distance between the tetrachlorosilane inlet and the molecular sieve outlet, the molecular sieve is moved by gravity in the reactor.

a-8. The process according to Solution a-7, wherein the angle between the axis of the tube body of the reactor and the horizontal plane is 40-80°.

a-9. The process according to Solution a-1, wherein the gas-phase ultra-stabilization reactor comprises a molecular sieve inlet, a tetrachlorosilane inlet, a tube body of the reactor, and a molecular sieve outlet, at least a part of the tube body of the reactor is configured as being rotatable around the axis of the tube body.

a-10. The process according to Solution a-1 or a-9, wherein the tube body of the reactor is a straight tube, at least a part of the tube body can rotate around the axis of the tube body at a rotation speed of 0.05-40 rpm, preferably 0.1-15 rpm.

a-11. The process according to Solution a-1 or a-9, wherein the part of the gas-phase ultra-stabilization reactor that can rotate around the axis of the tube body comprises a dam plate and a seizing plate.

a-12. The process according to Solution a-9, wherein the angle between the tube body and the horizontal plane is 5-80°.

a-13. The process according to any of Solutions a-9 to a-12, wherein an inner tube is provided in the tube body of the reactor, the molecular sieve and tetrachlorosilane are contacted and reacted in the annular space between the tube body and the inner tube.

a-14. The process according to Solution a-13, wherein the ratio of the outer diameter of the inner tube to the inner diameter of the tube body of the reactor is ¼-¾.

a-15. The process according to Solution a-1, wherein the gas-phase ultra-stabilization reactor comprises a molecular sieve inlet, a tetrachlorosilane inlet, a tube body of the reactor and a molecular sieve outlet, the tube body of the reactor is provided with a mechanical conveying device, the mechanical conveying device can move the molecular sieve from the molecular sieve inlet to the molecular sieve outlet of the gas-phase ultra-stabilization reactor.

a-16. The process according to Solution a-15, wherein the mechanical conveying device is belt conveyor, reciprocating piston conveyor, tube chain conveyor, screw conveyor, or a combination thereof.

a-17. The process according to Solution a-15 or a-16, wherein the angle between the axis of the tube body of the reactor and the horizontal plane is 0-70°.

a-18. The process according to Solution a-17, wherein the angle between the tube body of the reactor and the horizontal plane is 25-55°.

a-19. The process according to Solution a-1, wherein the reactor is a tube reactor, the tube body of the reactor has a length of 5-200 meters, the tube body has an inner diameter of 0.1-6 meters.

a-20. The process according to Solution a-19, wherein the tube body of the reactor has an inner diameter of 0.2-1.5 meters.

a-21. The process according to Solution a-1 or a-20, wherein the flow rate of the molecular sieve is 50-2000 kg/hr.

b-1. A process for preparing a catalytic cracking catalyst, which process comprises: a molecular sieve is introduced into a gas-phase ultra-stabilization reactor, the molecular sieve is moved without the conveying of carrier gas from a molecular sieve inlet of the gas-phase ultra-stabilization reactor to a molecular sieve outlet of the gas-phase ultra-stabilization reactor, the molecular sieve is contacted and reacted with a gaseous $SiCl_4$ in the gas-phase ultra-stabilization reactor, the molecular sieve resulting from the contacting and the reacting is washed, then mixed with a matrix into slurry, and shaped into particles.

b-2. The process according to Solution b-1, wherein in the gas-phase ultra-stabilization reactor, the contact temperature of the molecular sieve and the gaseous $SiCl_4$ is 250-700° C., the reaction time of the molecular sieve in the gas-phase ultra-stabilization reactor is 10 seconds to 100 minutes.

b-3. The process according to Solution b-1, wherein "being moved without the conveying of carrier gas from a molecular sieve inlet of the gas-phase ultra-stabilization reactor to a molecular sieve outlet of the gas-phase ultra-stabilization reactor" is accomplished by using belt conveyor, tube chain conveyor, screw conveyor, reciprocating piston conveyor, tube gravity conveyor or a combination thereof.

b-4. The process according to Solution b-1, wherein the gas-phase ultra-stabilization reactor comprises a molecular sieve inlet, a tetrachlorosilane inlet, a tube body of the reactor and a molecular sieve outlet, the molecular sieve inlet is above the molecular sieve outlet.

b-5. The process according to Solution b-1 or b-4, wherein the molecular sieve and the tetrachlorosilane have the same inlet, or the molecular sieve inlet and the tetrachlorosilane inlet are located at the same end of the gas-phase ultra-stabilization reactor.

b-6. The process according to Solution b-4, wherein the ratio of the length to the inner diameter of the reactor is 3-100:1.

b-7. The process according to Solution b-1, wherein the gas-phase ultra-stabilization reactor comprises a molecular sieve inlet, a tetrachlorosilane inlet, a tube body of the reactor, and a molecular sieve outlet, the angle between the tube body of the reactor and the horizontal plane is 30-90°, the molecular sieve inlet is located at the upper end of the tube body, the molecular sieve outlet is located at the lower end of the tube body, the molecular sieve outlet is communicated with the gas-solid separation device, the distance between the tetrachlorosilane inlet and the molecular sieve inlet is larger than the distance between the tetrachlorosilane inlet and the molecular sieve outlet, the molecular sieve is moved by gravity in the reactor.

b-8. The process according to Solution b-7, wherein the angle between the axis of the tube body of the reactor and the horizontal plane is 40-80°.

b-9. The process according to Solution b-1, wherein the gas-phase ultra-stabilization reactor comprises a molecular sieve inlet, a tetrachlorosilane inlet, a tube body of the reactor, and a molecular sieve outlet, at least a part of the tube body of the reactor is configured as being rotatable around the axis of the tube body.

b-10. The process according to Solution b-1 or b-9, wherein the tube body of the reactor is a straight tube, at least a part of the tube body can rotate around the axis of the tube body at a rotation speed of 0.05-40 rpm, preferably 0.1-15 rpm.

b-11. The process according to Solution b-1 or b-9, wherein the part of the gas-phase ultra-stabilization reactor that can rotate around the axis of the tube body comprises a dam plate and a seizing plate.

b-12. The process according to Solution b-9, wherein the angle between the tube body and the horizontal plane is 5-80°.

b-13. The process according to any of Solutions b-9 to b-12, wherein an inner tube is provided in the tube body of the reactor, the molecular sieve and tetrachlorosilane are contacted and reacted in the annular space between the tube body and the inner tube.

b-14. The process according to Solution b-13, wherein the ratio of the outer diameter of the inner tube to the inner diameter of the tube body of the reactor is ¼-¾.

b-15. The process according to Solution b-1, wherein the gas-phase ultra-stabilization reactor comprises a molecular sieve inlet, a tetrachlorosilane inlet, a tube body of the reactor and a molecular sieve outlet, the tube body of the reactor is provided with a mechanical conveying device, the mechanical conveying device can move the molecular sieve from the molecular sieve inlet to the molecular sieve outlet of the gas-phase ultra-stabilization reactor.

b-16. The process according to Solution b-15, wherein the mechanical conveying device is belt conveyor, reciprocating piston conveyor, tube chain conveyor, screw conveyor, or a combination thereof.

b-17. The process according to Solution b-15 or b-16, wherein the angle between the axis of the tube body of the reactor and the horizontal plane is 0-70°.

b-18. The process according to Solution b-17, wherein the angle between the tube body of the reactor and the horizontal plane is 25-55°.

b-19. The process according to Solution b-1, wherein the reactor is a tube reactor, the tube body of the reactor has a length of 5-200 meters, the tube body has an inner diameter of 0.1-6 meters.

b-20. The process according to Solution b-19, wherein the tube body of the reactor has an inner diameter of 0.2-1.5 meters.

b-21. The process according to Solution b-1 or b-20, wherein the flow rate of the molecular sieve is 50-2000 kg/hr.

c-1. A process for preparing a molecular sieve, which comprises: a molecular sieve is introduced into a gas-phase ultra-stabilization reactor, the molecular sieve is moved without the conveying of carrier gas from a molecular sieve inlet of the gas-phase ultra-stabilization reactor to a molecular sieve outlet of the gas-phase ultra-stabilization reactor, the molecular sieve is contacted and reacted with a gaseous $SiCl_4$ in the gas-phase ultra-stabilization reactor.

c-2. The process according to Solution c-1, wherein the contact temperature of the molecular sieve and the gaseous $SiCl_4$ in the reactor is 250-700° C., the reaction time of the molecular sieve in the gas-phase ultra-stabilization reactor is 10 seconds to 100 minutes.

c-3. The process according to Solution c-1, wherein "being moved without the conveying of carrier gas from a molecular sieve inlet of the gas-phase ultra-stabilization reactor to a molecular sieve outlet of the gas-phase ultra-stabilization reactor" is accomplished by using belt conveyor, tube chain conveyor, screw conveyor, reciprocating piston conveyor, tube gravity conveyor or a combination thereof.

c-4. The process according to Solution c-1, wherein the gas-phase ultra-stabilization reactor comprises a molecular sieve inlet, a tetrachlorosilane inlet, a tube body of the reactor and a molecular sieve outlet, the molecular sieve inlet is above the molecular sieve outlet.

c-5. The process according to Solution c-1 or c-4, wherein the molecular sieve and the tetrachlorosilane have the same inlet, or the molecular sieve inlet and the tetrachlorosilane inlet are located at the same end of the gas-phase ultra-stabilization reactor.

c-6. The process according to Solution c-4, wherein the ratio of the length to the inner diameter of the reactor is 3-100:1.

c-7. The process according to Solution c-1, wherein the gas-phase ultra-stabilization reactor comprises a molecular sieve inlet, a tetrachlorosilane inlet, a tube body of the reactor, and a molecular sieve outlet, the angle between the tube body of the reactor and the horizontal plane is 30-90°, the molecular sieve inlet is located at the upper end of the tube body, the molecular sieve outlet is located at the lower end of the tube body, the molecular sieve outlet is communicated with the gas-solid separation device, the distance between the tetrachlorosilane inlet and the molecular sieve inlet is larger than the distance between the tetrachlorosilane inlet and the molecular sieve outlet, the molecular sieve is moved by gravity in the reactor.

c-8. The process according to Solution c-7, wherein the angle between the axis of the tube body of the reactor and the horizontal plane is 40-80°.

c-9. The process according to Solution c-1, wherein the gas-phase ultra-stabilization reactor comprises a molecular sieve inlet, a tetrachlorosilane inlet, a tube body of the reactor, and a molecular sieve outlet, at least a part of the tube body of the reactor is configured as being rotatable around the axis of the tube body.

c-10. The process according to Solution c-1 or c-9, wherein the tube body of the reactor is a straight tube, at least a part of the tube body can rotate around the axis of the tube body at a rotation speed of 0.05-40 rpm, preferably 0.1-15 rpm.

c-11. The process according to Solution c-1 or c-9, wherein the part of the gas-phase ultra-stabilization reactor that can rotate around the axis of the tube body comprises a dam plate and a seizing plate.

c-12. The process according to Solution c-9, wherein the angle between the tube body and the horizontal plane is 5-80°.

c-13. The process according to any of Solution c-9 to c-12, wherein an inner tube is provided in the tube body of the reactor, the molecular sieve and tetrachlorosilane are contacted and reacted in the annular space between the tube body and the inner tube.

c-14. The process according to Solution c-13, wherein the ratio of the outer diameter of the inner tube to the inner diameter of the tube body of the reactor is ¼-¾.

c-15. The process according to Solution c-1, wherein the gas-phase ultra-stabilization reactor comprises a molecular sieve inlet, a tetrachlorosilane inlet, a tube body of the reactor and a molecular sieve outlet, the tube body of the reactor is provided with a mechanical conveying device, the mechanical conveying device can move the molecular sieve from the molecular sieve inlet to the molecular sieve outlet of the gas-phase ultra-stabilization reactor.

c-16. The process according to Solution c-15, wherein the mechanical conveying device is belt conveyor, reciprocating piston conveyor, tube chain conveyor, screw conveyor, or a combination thereof.

c-17. The process according to Solution c-15 or c-16, wherein the angle between the axis of the tube body of the reactor and the horizontal plane is 0-70°.

c-18 The process according to Solution c-17, wherein the angle between the tube body of the reactor and the horizontal plane is 25-55°.

c-19. The process according to Solution c-1, wherein the reactor is a tube reactor, the tube body of the reactor has a length of 5-200 meters, the tube body has an inner diameter of 0.1-6 meters.

c-20. The process according to Solution c-19, wherein the tube body of the reactor has an inner diameter of 0.2-1.5 meters.

c-21. The process according to Solution c-1 or c-20, wherein the flow rate of the molecular sieve is 50-2000 kg/hr.

d-1. An apparatus for preparing a molecular sieve, which apparatus comprises a Na-type molecular sieve exchanging device, a calciner, a molecular sieve gas-phase ultra-stabilization reactor and a gas-solid separator, wherein the Na-type molecular sieve exchanging device is for exchanging the Na-type molecular sieve, the calciner is for calcining the exchanged molecular sieve, the molecular sieve gas-phase ultra-stabilization reactor is for subjecting the calcined molecular sieve to the gas-phase chemical dealumination and silicon insertion reaction, the gas-solid separator is for separating the molecular sieve discharged from the gas-phase ultra-stabilization reactor from the unreacted tetrachlorosilane; the gas-phase ultra-stabilization reactor comprises a molecular sieve inlet, a tetrachlorosilane inlet and a molecular sieve outlet, the gas-phase ultra-stabilization reactor can move the molecular sieve introduced therein from the molecular sieve inlet to the molecular sieve outlet without the conveying of carrier gas.

d-2. The apparatus according to Solution d-1, wherein "being moved without the conveying of carrier gas from a molecular sieve inlet of the gas-phase ultra-stabilization reactor to a molecular sieve outlet of the gas-phase ultra-stabilization reactor" is accomplished by using belt conveyor, tube chain conveyor, screw conveyor, reciprocating piston conveyor, tube gravity conveyor or a combination thereof.

d-3. The apparatus according to Solution d-1, wherein the gas-phase ultra-stabilization reactor comprises a molecular sieve inlet, a tetrachlorosilane inlet, a tube body of the reactor and a molecular sieve outlet, the molecular sieve inlet is above the molecular sieve outlet.

d-4. The apparatus according to Solution d-1 or d-3, wherein the molecular sieve and the tetrachlorosilane have the same inlet, or the molecular sieve inlet and the tetrachlorosilane inlet are located at the same end of the gas-phase ultra-stabilization reactor.

d-5. The apparatus according to Solution d-1, wherein the gas-phase ultra-stabilization reactor comprises a molecular sieve inlet, a tetrachlorosilane inlet, a tube body of the reactor, and a molecular sieve outlet, the angle between the tube body of the reactor and the horizontal plane is 30-90°, the molecular sieve inlet is located at the upper end of the tube body, the molecular sieve outlet is located at the lower end of the tube body, the molecular sieve outlet is communicated with the gas-solid separation device, the distance between the tetrachlorosilane inlet and the molecular sieve inlet is larger than the distance between the tetrachlorosilane inlet and the molecular sieve outlet, the molecular sieve is moved by gravity in the reactor.

d-6. The apparatus according to Solution d-5, wherein the angle between the axis of the tube body of the reactor and the horizontal plane is 40-80°.

d-7. The apparatus according to Solution d-1, wherein the gas-phase ultra-stabilization reactor comprises a molecular sieve inlet, a tetrachlorosilane inlet, a tube body of the reactor, and a molecular sieve outlet, at least a part of the tube body of the reactor is configured as being rotatable around the axis of the tube body.

d-8. The apparatus according to Solution d-1 or d-7, wherein the tube body of the gas-phase ultra-stabilization reactor is a straight tube, at least a part of the tube body can rotate around the axis of the tube body at a rotation speed of 0.05-40 rpm, preferably 0.1-15 rpm.

d-9. The apparatus according to Solution d-1 or d-7, wherein the part of the gas-phase ultra-stabilization reactor that can rotate around the axis of the tube body comprises a dam plate and a seizing plate.

d-10. The apparatus according to Solution d-7, wherein the angle between the tube body and the horizontal plane is 5-80°.

d-11. The apparatus according to Solution d-7 or d-10, wherein an inner tube is provided in the tube body of the reactor, the molecular sieve and tetrachlorosilane are contacted and reacted in the annular space between the tube body and the inner tube.

d-12. The apparatus according to Solution d-11, wherein the ratio of the outer diameter of the inner tube to the inner diameter of the tube body of the reactor is ¼-¾.

d-13. The apparatus according to Solution d-1, wherein the gas-phase ultra-stabilization reactor comprises a molecular sieve inlet, a tetrachlorosilane inlet, a tube body of the reactor and a molecular sieve outlet, the tube body of the reactor is provided with a mechanical conveying device, the mechanical conveying device is belt conveyor, reciprocating piston conveyor, tube chain conveyor, screw conveyor, or a combination thereof d-14. The apparatus according to Solution d-13, wherein the angle between the axis of the tube body of the reactor and the horizontal plane is 0-70°.

d-15. The apparatus according to Solution d-14, wherein the angle between the tube body of the reactor and the horizontal plane is 25-55°.

d-16. The apparatus according to Solution d-1, wherein the reactor is a tube reactor, the tube body of the reactor has a length of 5-200 meters, the tube body has an inner diameter of 0.1-6 meters.

d-17. The apparatus according to Solution d-16, wherein the tube body of the reactor has an inner diameter of 0.2-1.5 meters.

d-18. The apparatus according to any of Solutions d-1 to d-18, wherein the ratio of the length to the inner diameter of the reactor is 3-100:1.

d-19. The apparatus according to Solution d-1, wherein the calciner comprises a calciner's barrel and a heating device for heating the calciner's barrel, the calciner's barrel comprises an inlet, an outlet, and an intermediate barrel between inlet and outlet, the intermediate barrel is provided with a dam plate and a seizing plate.

d-20. The apparatus according to Solution d-19, wherein the angle between the extension direction of the seizing plate and the axis direction of the the calciner's barrel is an acute angle or an obtuse angle.

d-21. The apparatus according to Solution d-20, wherein the angle is greater than 0° and less than 45°.

d-22. The apparatus according to Solution d-1, wherein the Na-type molecular sieve exchanging device comprises an exchanger, a second belt filter, and optionally further comprises a first dryer; the exchanger is for exchanging the Na-type molecular sieve with the exchanging ions, the second belt filter is for separating the exchanging mother liquor from the exchanged molecular sieve; the first dryer is for drying the exchanged molecular sieve obtained from the second belt filter.

d-23. A process for preparing a molecular sieve, which comprises introducing a Na-type molecular sieve to the apparatus according to any of Solutions d-1 to d-22 for modification.

d-24. The process according to Solution d-23, wherein in the gas-phase ultra-stabilization reactor, the contact temperature of the molecular sieve and the gaseous $SiCl_4$ is 250-700° C., the reaction time of the molecular sieve in the gas-phase ultra-stabilization reactor is 10 seconds to 100 minutes.

d-25. The process according to Solution d-23, wherein the calcination temperature of the calciner is 300-500° C.

d-26. The process according to Solution d-23, wherein in the exchanger, the exchanging ion for exchanging with the Na-type molecular sieve comprises one or more of rare-earth ions and ammonium ions.

d-27. The process according to Solution d-23, wherein the added amount of the Na-type molecular sieve is 50-2000 kg/hr.

EXAMPLE

Hereinafter, the present invention will be further illustrated with the following examples, which should not be construed as a limitation to the present invention in any way.

Example 1

A molecular sieve gas-phase silicon insertion apparatus was made with a stainless steel of NiCr18Ti in a thickness of 3 mm according to FIG. 2a or 2b or FIG. 8. The upper part of the gas-solid separator 2 was a cylinder with a diameter of 6 meters and a height of 14 meters. The lower part was a cone with an opening. The cone had a cone angle of 45°. A valve was provided at the opening. The outlet was located at a position away from the top of the gas-solid separator by 1 meter. The absorber 3 held an aqueous sodium hydroxide solution (10 mol/L). The absorber 3 and the gas-solid separator 2 were communicated via a conduit, which was inserted into the aqueous sodium hydroxide solution.

The reactor 1 was a tube reactor, as shown in FIG. 5. The tube body had a total length of 80 meters. The tube body had a diameter of 0.8 meters. The tube body of the reactor was made in an annular shape. The reactor included the upper layer of straight tube and the lower layer of straight tube. The upper and lower layers of straight tubes were installed horizontally. The angle between the axis and the horizontal plane was 0°. The two ends of the upper and lower layers of straight tubes were respectively connected with bent tubes. Each of bent tubes was in a semicircular shape. Each bent tube had a length of 6 meters. The upper and lower layers of straight tubes were 34 meters. Thus, the tube body on the whole was in an annular shape. The belt conveyor 52 was placed inside the annular tube body. At one end of the annular tube body, the first inlet 12 (molecular sieve inlet) was set on the upper layer. The second inlet 22 was set downstream of the first inlet and away from the first inlet by 2 meters. At the other end of the annular tube body, a gas outlet 62 was set on the upper layer and an outlet 32 was set on the lower layer. The gas outlet 62 was installed with a gas-solid separator to prevent the molecular sieve's loss via the gas outlet. The molecular sieve was moved on the conveying belt. The belt conveyor was made with an anti-corrosive metal belt. The width of the metal belt was almost equal to the diameter of the annular tube body. As shown in FIG. 5, the molecular sieve came into the tube body of the reactor from the first inlet 12 at left-upper portion of the reactor), fell onto the conveying belt 52 in the upper layer of the tube body of the reactor, moved to the right along with the conveying belt. The tetrachlorosilane gas came into the reactor from the second inlet (tetrachlorosilane inlet 22), and flowed on the whole toward the gas outlet 62. During the moving, the tetrachlorosilane gas and the molecular sieve were subjected to the ultra-stabilization reaction of dealumination and silicon insertion. The gas concentration gradually reduced. When reaching the gas outlet 62, the concentration of tetrachlorosilane in the gas phase became very low, and the reaction rate of dealumination and silicon insertion greatly reduced too. The gas was discharged from the gas outlet 62. The molecular sieve was moved along with the conveying belt to the bent tube zone, separated from the conveying belt, and discharged from the gas-phase ultra-stabilization reactor via the molecular sieve outlet 32. The conveying belt, after being separated from the molecular sieve, returned to the molecular sieve inlet through the lower layer of the tube body.

The rare-earth containing Y-type molecular sieve coming from the calciner and having a temperature of 350° C. (solid content 98.5 wt %, rare-earth content=15.0 wt %, Si/Al ratio (Silica/Alumina) 5.26, Na2O content 4.8 wt %, similar hereinafter) and the SiCl$_4$ gas having a temperature of 90° C., were continuously fed to the tube body of the tube reactor 1 respectively from the first inlet 12 and the second inlet 22. Meanwhile, the annular tube body of the tube reactor was divided into 10 stages, each stage 10 meters. The outer wall of each of the tube body was wrapped with one electric heat tape to heat the tube reactor, so that the temperature of each heating stage in the tube reactor 1 was 400° C. The flow rate of SiCl$_4$ was controlled by a flow meter. The weight ratio of SiCl$_4$ to the molecular sieve was 0.25, the feeding amount of the molecular sieve was 800 kg/hr, the residence time of the molecular sieve in the tube reactor 1 was 10 minutes. After 1.5 hours of reaction, the molecular sieve was discharged from the gas-solid separator 2 via the opening in the cone bottom to obtain the high silica molecular sieve A1. A1 and decationized water were mixed into slurry, washed, filtered, and dried at 120° C. to obtain the high silica molecular sieve A, the main properties of which were listed in Table 1. The height of the molecular sieve on the conveying belt was about 2 cm. In order to avoid the thickness of the molecular became too high to cause the non-uniformity, the level limiting plate can be installed in the tube body of the reactor. By controlling the distance between the bottom of the level limiting plate and the conveying belt, the thickness of the molecular sieve layer on the conveying belt can be controlled.

Example 2

A molecular sieve gas-phase silicon insertion apparatus was made with a stainless steel of NiCr18Ti in a thickness of 3 mm according to FIG. 2*a* or 2*b* or FIG. 8. The upper part of the gas-solid separator 2 was a cylinder with a diameter of 6 meters and a height of 14 meters. The lower part was a cone with an opening. The cone had a cone angle of 45°. A valve was provided at the opening. The outlet was located at a position away from the top of the gas-solid separator by 1 meter. The absorber 3 held an aqueous sodium hydroxide solution (10 mol/L). The absorber 3 and the gas-solid separator 2 were communicated via a conduit, which was inserted into the aqueous sodium hydroxide solution.

The tube body of the tube reactor 1 had a length of 60 meters and was a straight tube. The angle between the axis of the tube body of the reactor and the horizontal plane was 45°. The tube body had an inner diameter of 1 meter. As shown in FIG. 3, the molecular sieve was conveyed by gravity. The tube body inclined at 45°. The center of the molecular sieve inlet was away from the upper end surface by 1 meter. The tetrachlorosilane inlet was away from that end surface by 2.5 meters. The intermediate part of the tube body (the rotatable part, having a total length of 53 meters and being away from the inlet end surface by 4 meters) was rotated at 5 r/min. Inside the rotatable part of the tube body were provided three seizing plates 11. The seizing plate had a width of 5 cm, and was parallel to the axis of the tube body and perpendicular to the incisal plane of the intersecting line of the tube wall and the seizing plate. Meanwhile, on the inner wall of the tube body were welded two dam plates 21, one dam plate was away from the molecular sieve inlet end surface by 30 meters, and the second dam plate was away from the same end surface by 55 meters and away from the opposite end surface by 5 meters. Two dam plates were in circular ring shape, and had a height of 8 cm, and were perpendicular to the axis of the tube body. At one end of the tube body, were installed an inlet 31, and a second inlet 41 away from the first by 1.5 m. At the other end of the tube body, were set an outlet 51 and a gas outlet 71. In the middle of the tube body was set a heat insulation barrel having an outer diameter of 60 cm and the same length as the tube body. The heat insulation barrel was for reducing the heat loss, and made the gas-phase ultra-stabilization reaction uniform.

As shown in FIG. 3, the rare-earth containing Y-type molecular sieve coming from the calciner and having a temperature of 300° C. (solid content 98.5 wt %, rare-earth content=15.0 wt %, Si/Al ratio 5.26, Na2O content 4.8 wt %) and the SiCl$_4$ gas having a temperature of 80° C., were continuously fed to the tube body of the tube reactor 1 respectively from the first inlet 31 and the second inlet 41. Meanwhile, the tube body of the tube reactor was divided into 12 stages, each stage 5 meters. The outer wall of each of the tube body was wrapped with one electric heat tape to heat the tube reactor, so that the temperature in the tube reactor 1 was 300° C. (the temperature of the molecular sieve outlet). The flow rate of SiCl$_4$ was controlled by a flow meter. The weight ratio of SiCl$_4$ to the molecular sieve was 0.05, the feeding amount of the molecular sieve was 1000 kg/hr, and the residence time of the molecular sieve in the tube reactor 1 was 5 minutes. After 1 hour of reaction, the molecular sieve was discharged from the gas-solid separator 2 via the opening in the cone bottom to obtain the molecular sieve B1. B1 and decationized water were mixed into slurry, washed, filtered, and dried at 120° C. to obtain the high silica molecular sieve B, the main properties of which were listed in Table 1.

Example 3

A molecular sieve gas-phase silicon insertion apparatus was made with a stainless steel of NiCr18Ti in a thickness of 3 mm according to FIG. 2*a* or 2*b* or FIG. 8. The angle between the axis of the tube body of the reactor and the horizontal plane was 55°. The inner diameter of the tube body was 0.5 meter. The upper part of the gas-solid separator 2 was a cylinder with a diameter of 6 meters and a height of 14 meters. The lower part was a cone with an opening. The cone had a cone angle of 45°. A valve was provided at the opening. The outlet was located at a position away from the top of the gas-solid separator by 1 meter. The absorber 3 held an aqueous sodium hydroxide solution (10 mol/L). The absorber 3 and the gas-solid separator 2 were communicated via a conduit, which was inserted into the aqueous sodium hydroxide solution.

Figure 6:
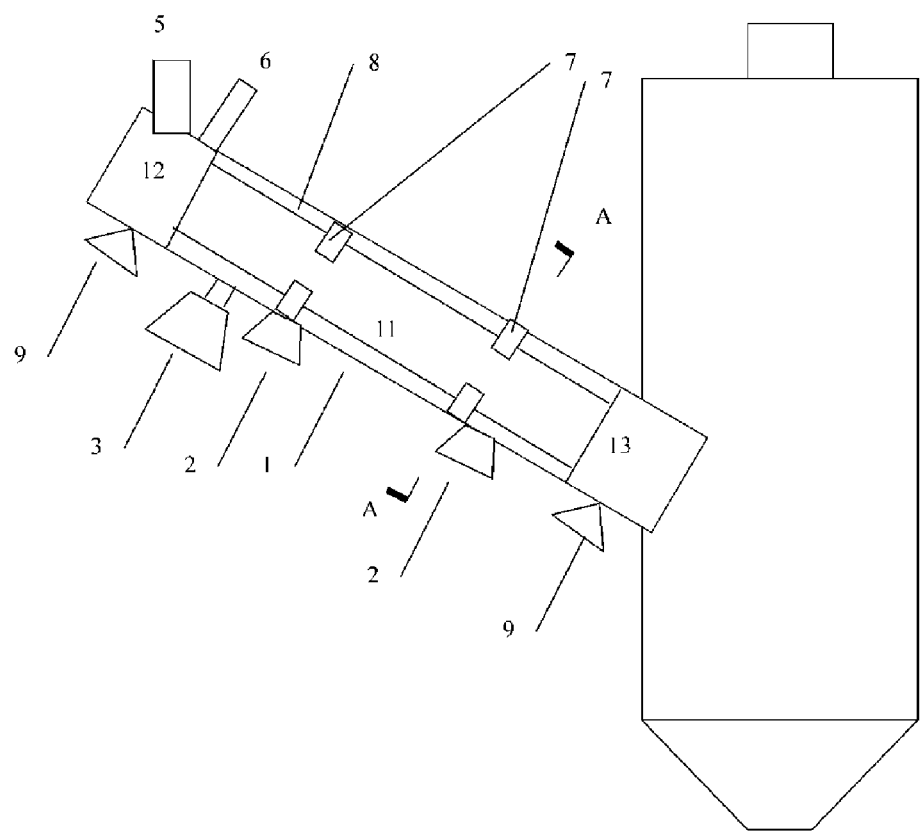
FIG. 6 shows a structure illustration of the gas-phase ultra-stabilization as mentioned in Example 3.
Figure 7:
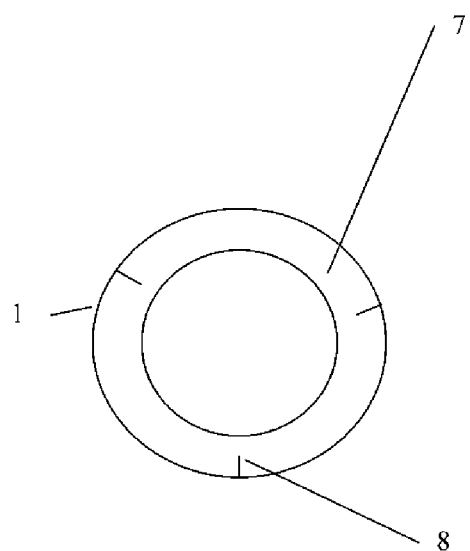
FIG. 7 shows an illustration of the seizing plate and the dam plate from the cross-section A-A of the tube body as mentioned in Example 3, wherein 7 represents the dam plate, 8 represents the seizing plate, and 1 represents the tube body.

The gas-phase ultra-stabilization reaction apparatus was shown in FIG. 6. The molecular sieve was moved by gravity in the gas-phase ultra-stabilization reactor. The reactor comprised a molecular sieve inlet 5, a gaseous tetrachlorosilane inlet 6. The tube body of the reactor 1 was a straight tube, including a molecular sieve inlet end 12, a rotatable part 11 and a molecular sieve outlet end 13. The molecular sieve inlet end 12 and the molecular sieve outlet end 13 were supported by the supporters 9. The driver 3 drove the rotatable part 11 to rotate around the axis of the tube body 1. The supporters 2 were used to support the rotatable part 11. The rotatable part was provided with a seizing plate 8 and dam plates 7. The connections for the rotatable part 11, the molecular sieve inlet end 12, and the molecular sieve outlet end 13 were active connections and were sealed from the environment. The outlet of the molecular sieve was set on the end surface of the outlet end 13. On the end surface was provided with a baffle plate. By adjusting the baffle plate, the size of the molecular sieve outlet can be adjusted. In this example, the tube body was a round straight tube. The length of the tube body was 12 meters, the length of the rotatable part 11 was 9 meters, the length of the molecular sieve inlet end 12 was 1.8 meters, the length of the molecular sieve outlet end 13 was 1.2 meters, and the inner diameter of the tube body 1 was 0.8 meters. The angle between the axis of the tube body and the horizontal plane was 35°. The rotatable part 11 of the tube body 1 was rotated at 5 r/min. Inside the tube body were provided three seizing plates 8. The seizing plate had a height of 5 cm, and was parallel to the axis and perpendicular to the incisal plane of the intersecting line of the tube wall and the seizing plate. Meanwhile, on the inner wall of the tube body were welded two dam plates 7. Their plate surfaces were perpendicular to the axis of the tube body 1. Their height is 6 cm. one dam plate was away from the molecular sieve inlet end surface by 3 meters, and the second dam plate was away from the same end surface by 6 meters. FIG. 6 was the illustration of A-A section of FIG. 6.

The rare-earth containing Y-type molecular sieve coming from the calciner and having a temperature of 300° C. (solid content 98.5 wt %, rare-earth content=15.0 wt %, Si/Al ratio 5.26, Na2O content 4.8 wt %) and the $SiCl_4$ gas having a temperature of 80° C., were continuously fed to the tube body of the tube reactor 1 respectively from the molecular sieve inlet 5 and the gas-phase tetrachlorosilane inlet 6. The outer wall of the rotatable part 11 of the tube body was wrapped with one electric heat tape to heat the tube reactor, so that the temperature in the tube reactor 1 was 300° C. (the temperature of the reactor molecular sieve outlet). The flow rate of $SiCl_4$ was controlled by a flow meter. The weight ratio of $SiCl_4$ to the molecular sieve was 0.05, the feeding amount of the molecular sieve was 1000 kg/hr, and the residence time of the molecular sieve in the tube reactor 1 was 5 minutes. After 1 hour of reaction, the molecular sieve was discharged from the gas-solid separator 2 via the opening in the cone bottom to obtain the molecular sieve Cl. Cl and decationized water were mixed into slurry, washed, filtered, and dried at 120° C. to obtain the high silica molecular sieve C, the main properties of which were listed in Table 1.

Comparative Example 1

According to the method disclosed in Example 1 of CN102049315A, the molecular sieve E was prepared. The used rare-earth containing Y-type molecular sieve was identical to that in Example 1. It was divided into stages, 5 meter per stage. The heating belts were provided for each stage to heat it. The reaction temperature and the reaction time were identical to those in Example 3 (300° C. and 5 minutes). The ratio of tetrachlorosilane to the molecular sieve was 0.3. The feeding amount was 1 ton/hr. After washing, the molecular sieve E was obtained. The corresponding unwashed molecular sieve (after reaction) was noted as E1. Their properties were listed in Table 1. It could be seen that under the same reaction temperature and time, the present invention produced the better dealumination effect, and remarkably reduced the used amount of tetrachlorosilane.

Comparative Example 2

Adjusting the weight ratio of tetrachlorosilane and molecular sieve in Comparative Example 1 to 0.16 obtained the molecular sieve F, the main properties of which were listed in Table 1.

According to the present invention, the unit cell size, the relative crystallinity and the framework Si/Al ratio were determined by the method of X-ray powder diffraction. Experiment instruments: D5005 X-ray powder diffractometer made by Siemens AG, Germany. Experiment condition: Cu target, Kα radiation, solid state detector, tube voltage of 40 kV, tube current of 40 mA, step-scan with step of 0.02°, pre time of 2 s, scan sweep range of 5-70°.

According to the present invention, the lattice collapse temperature of the molecular sieve was determined by differential thermal analysis method. Experiment instruments: Dupont 1600 thermal analyzer, Dupont, USA. Experiment condition: air as carrier gas, flow rate of 40 mL/min, heating rate of 10° C./min.

According to the present invention, the specific surface area was determined by nitrogen adsorption static volumetric method. Experiment instruments: ASAP2400 nitrogen adsorption analyzer, Micromeritics. Experiment conditions: the sample was vacuumed and degassed in 1.33 Pa at 300° C. for 4 h, and then contacted with liquid nitrogen under 77K, isothermal adsorption, desorption, adsorption determination, desorption isotherm, the specific surface area was determined by BET formula.

According to the present invention, the composition of the material was determined by X-ray fluorescence spectrometry method. Experiment instruments: 3271 X-ray fluorescence spectrometer, Rigaku Industrial Corporation, Japan. Experiment condition: Powder sample was compressed and shaped, rhodium target, excitation voltage of 50 kV, excitation current of 50 mA, detecting the spectral line intensity of each element with scintillation counter and proportional counter, conducting quantitative analysis and semi-quantitative analysis for the content of elements with external standard method.

TABLE 1

| | Molecular Sieve No. | | | | | | | | | |
|---|---|---|---|---|---|---|---|---|---|---|
| | A | B | C | A1 | B1 | C1 | E | F | E1 | Industrial REY |
| Example No. | Example 1 | Example 2 | Example 3 | Example 1 | Example 2 | Example 3 | Comparative Example 1 | Comparative Example 2 | Comparative Example 1 | |
| Unit cell size, nm | 2.450 | 2.448 | 2.451 | 2.450 | 2.448 | 2.451 | 2.453 | 2.455 | 2.453 | 2.465 |
| Relative crystallinity, % | 60 | 59 | 62 | 54 | 52 | 57 | 56 | 58 | 50 | 46 |
| Framework Si/Al ratio ($SiO_2/Al_2O_3$ molar ratio) | 8.79 | 9.54 | 8.45 | 8.79 | 9.54 | 8.45 | 7.83 | 7.30 | 7.83 | 5.26 |
| Lattice collapse temperature, °C. | 1030 | 1038 | 1028 | — | — | — | 1026 | 1022 | — | 972 |
| Specific surface area, $m^2/g$ | 668 | 685 | 662 | — | — | — | 650 | 648 | — | 588 |
| Na2O content, wt % | 0.25 | 0.23 | 0.28 | 4.5 | 4.4 | 4.5 | 0.30 | 0.35 | 4.6 | 2.21 |
| RE2O3 content, wt % | 12.0 | 11.9 | 12.6 | 13.6 | 13.0 | 14.1 | 12.3 | 12.9 | 12.8 | 16.6 |

It could be seen from Table 1 that, in comparison with the industrial REY, the molecular sieve prepared according to the present invention had an increased framework Si/Al ratio ($SiO_2/Al_2O_3$ molar ratio). It showed a good dealumination and silicon insertion effect. In addition, it can be seen from Table 1 that in comparison with the industrial REY, the molecular sieve prepared according to the present invention improved relative crystallinity, lattice collapse temperature and specific surface area, and reduced the Na2O content. It showed that the molecular sieve prepared according to the present invention had good performance.

Examples 4-6

These examples showed the catalyst prepared with the high silica molecular sieves according to Examples 1-3.

Molecular sieve, kaolin, pseudo-boehmite and alumina sol in a weight ratio of 38:30:22:10 (dry basis) were mixed to slurry, and spray-dried at 450° C. to produce spherical catalytic cracking catalysts. The molecular sieves were the high silica molecular sieves A, B and C (Examples 1-3) respectively, and the catalysts A-1, A-2 and A-3 were obtained. Their main properties were listed in Table 2.

Examples 7-9

Molecular sieve, kaolin, pseudo-boehmite and alumina sol in a weight ratio of 38:30:18:9 (dry basis) were mixed to slurry, spray-dried at 450° C., and washed with decationized water to produce spherical catalytic cracking catalysts. The molecular sieves were the high silica molecular sieves A1, B1 and C1 (Examples 1-3) respectively, and the catalysts A-4, A-5 and A-6 were obtained. Their main properties were listed in Table 2.

Comparative Example 3

According to Examples 4-6, the industrial REY molecular sieves were used to prepare the catalysts.

The industrial REY molecular sieve was obtained from the NaY molecular sieve through rare-earth exchanging twice and calcination once. The main properties were listed in Table 1. The obtained catalyst was noted as Reference catalyst CC-1, and the main properties were listed in Table 2.

Comparative Example 4

According to Example 6, the used molecular sieve was the molecular sieve E, and others were unchanged to obtain the catalyst CC-2.

Comparative Example 5

The same amount of the molecular sieve E1 was used to replace the molecular sieve E in Comparative Example 4 to obtain the catalyst CC-3.

TABLE 2

| Catalyst No. | A-1 | A-2 | A-3 | A-4 | A-5 | A-6 | CC-1 | CC-2 | CC-3 |
|---|---|---|---|---|---|---|---|---|---|
| Molecular sieve No. | A | B | C | A1 | B1 | C1 | Industrial REY | E | E1 |
| Unit cell size, nm | 2.450 | 2.448 | 2.451 | 2.450 | 2.448 | 2.451 | 2.465 | 2.453 | 2.451 |
| Relative crystallinity, % | 21 | 21 | 22 | 19 | 18 | 20 | 16 | 20 | 20 |
| RE2O3 content, wt % | 4.94 | 4.9 | 5.17 | 5.55 | 5.32 | 5.74 | 6.31 | 5.06 | 5.24 |
| Al2O3 content, wt % | 49.1 | 48.4 | 48.5 | 50.6 | 49.4 | 50.1 | 52.1 | 49.3 | 50.0 |
| Na2O content, wt % | 0.06 | 0.05 | 0.05 | 0.05 | 0.04 | 0.04 | 0.19 | 0.13 | 0.12 |
| Sulfate group content, wt % | 1.1 | 1.1 | 1 | 1.2 | 1.3 | 1.2 | 1.3 | 1.2 | 1.3 |
| Loss on ignition, wt % | 11.5 | 11.1 | 11.4 | 11.7 | 11.3 | 11.6 | 12.1 | 12.2 | 12.3 |
| Pore volume/$(mL \cdot g^{-1})$ | 0.42 | 0.4 | 0.41 | 0.41 | 0.41 | 0.42 | 0.35 | 0.41 | 0.41 |

TABLE 2-continued

| Catalyst No. | A-1 | A-2 | A-3 | A-4 | A-5 | A-6 | CC-1 | CC-2 | CC-3 |
|---|---|---|---|---|---|---|---|---|---|
| Specific surface area/ ($m^2 \cdot g^{-1}$) | 285 | 295 | 278 | 298 | 305 | 285 | 245 | 284 | 286 |
| Abrasion index/(% $\cdot h^{-1}$) | 1.1 | 1.0 | 1.2 | 1.2 | 1..0 | 1.1 | 1.9 | 1.6 | 1.5 |
| Apparent bulk density/(g $\cdot mL^{-1}$) | 0.74 | 0.73 | 0.74 | 0.74 | 0.73 | 0.74 | 0.75 | 0.72 | 0.73 |
| Microactivity (800° C., 4 h)/% | 84 | 85 | 82 | 85 | 86 | 85 | 74 | 81 | 82 |
| Screening distribution, wt % | | | | | | | | | |
| 0-20 μm | 3.1 | 3.9 | 3.2 | 3.2 | 3.9 | 3.1 | 3.8 | 2.8 | 3.0 |
| 0-40 μm | 17.8 | 17.9 | 16.8 | 18.0 | 18.9 | 17.8 | 18.9 | 16.3 | 16.8 |
| 0-149 μm | 92.1 | 91.6 | 92 | 92.3 | 91.6 | 93.1 | 93.4 | 91.9 | 92.4 |
| Average particle diameter (μm) | 71.2 | 73.1 | 70.2 | 72.2 | 73.1 | 71.2 | 69.4 | 73.5 | 73.3 |

According to the present invention, the loss on ignition of the catalyst is determined as follows. the loss on ignition of the catalyst is the ratio of the reduced weight by high temperature calcination to the weight before the calcination (i.e., loss on ignition, with reference to RIPP32-90 analysis method, Analysis Methods for Petrochemical Industry, (RIPP Test Method), edited by Yang Cuiding et al., Science Press, 1990), the calcination temperature is generally 800° C., the calcination time is 2 hours, and the sample after calcination is weighed after being cooled in a dryer.

According to the present invention, the pore volume of the catalyst is determined as follows. The pore volume is measured by the water-dropping method. The sample of 40 meshes to 200 meshes is calcined at 600° C. for 2 hours. After cooling, 25 mL of the sample is added to a 100 mL conical flask. The weight (w2) of the added sample is measured. Distillate water is dropwise added with an acid burette until 90% of the anticipated amount of water is added. The flask stopper is tightly plugged, and then the flask is violently shaken for about 20 seconds. Then the titration is slowly conducted. If the temperature rises too quickly due to the heat release, the flask is cooled with an ice water to the room temperature. The titration is conducted until the sample can stick on the flask wall for at least 2 seconds, which is the endpoint of the titration. The volume ($V_{H2O}$) of distillated water consumed in the titration is recorded. The water-dropping pore volume of the sample is $V_g = V_{H2O}/w_2 - 0.01$.

According to the present invention, the abrasion index of the catalyst is determined as follows. The spray-dried sample of the catalyst is calcined at 600° C. for 2 hours. After cooling, 10 g of the sample is placed in the vertical tube of the fluidization abrasion index tester. A moisture containing compressed air is introduced at a certain flow rate from the bottom of the tube. After 1 hour of fluidization, the fine powder in the filtration paper cylinder (a fine powder collector) is discarded. A new filtration paper cylinder is used for a further fluidization of 4 hours. The weight (w1) of the fine powder in the fine powder collector and the weight (w2) of the residual sample in the vertical tube are measured. The fluidization abrasion index is calculated based on the following equation: $AI = w_1/(w_1+w_2)/4$. The experiment conditions: the air is used as carrier gas; the flow rate is 140 mL/min, and the heating rate is 10° C./min.

According to the present invention, the apparent bulk density of the catalyst is determined as follows. The apparent bulk density of the sample is determined by the free-settlement method. The experiment apparatus is a 25 mL measuring cylinder with an inner diameter of 20 mm. The cylinder is cut just at the scale of 25 mL and ground to the flatness. During the measurement, the cylinder is placed under a funnel, and the sample is poured into the funnel. The sample is continuously poured into the funnel in 30 seconds and runs over the funnel. The redundant catalyst is removed with a scraper, and the catalyst out of the cylinder is cleaned off. The cylinder is weighed, and then the apparent bulk density of the catalyst can be calculated (in a unit of g/mL).

According to the present invention, the screening distribution and the average particle diameter of the catalyst are determined by the laser method.

Test on the Catalytic Cracking Properties of the Catalyst

The light oil micro-activity evaluation is conducted according to the standard method RIPP92-90 (with reference to *Analysis Methods for Petrochemical Industry* (RIPP Test Method), edited by Yang Cuiding et al., Science Press, 1990) to measure the light oil microactivity of the sample. The catalyst loading is 5.0 g. The reaction temperature is 460° C. The sample oil is Dagang light diesel oil having a distillation range of 235-337° C. The product composition is analyzed with a gas chromatography. The light oil microactivity is calculated based on the product's composition. The result is shown in Table 2.

The light oil microactivity (MA)=(gasoline(<216° C. in product)yield+gas yield+coke yield)/total feedstock×100%

Assess conditions for heavy oil cracking properties: The catalyst is aged at 800° C., 100% steam for 12 hours, and then accessed on ACE (fixed-fluidized bed), the feedstock is Wuhun III heavy oil (see Table 3), Reaction Temperature=500° C., Catalyst/Oil weight ratio=4.

wherein, conversion=gasoline yield+liquefied gas yield+dry gas yield+coke yield
light oil yield=gasoline yield+diesel oil yield
liquid yield=liquefied gas+gasoline+diesel oil
Coke Selectivity=coke productivity/conversion According to the above methods, the catalysts of Examples 4-6 and Comparative Examples 3-4 were assessed and the results are listed in Table 4.

It can be seen from Table 2 that, in comparison with the catalysts based on REY molecular sieves, the catalysts based on the present molecular sieves had the increased pore volume and specific surface area. The microactivity remarkably improved. In comparison with the catalyst based on carrier gas convey, the properties of the present catalysts did not become worse, but even better.

TABLE 3

| Feedstock | ACE assessment |
|---|---|
| Density (20° C.), g/cm³ | 0.9044 |
| refraction (20° C.) | 1.5217 |
| viscosity (100° C.), mm²/s | 9.96 |
| freezing point, ° C. | 40 |
| aniline point, ° C. | 95.8 |
| C wt % | 85.98 |
| H wt % | 12.86 |
| S wt % | 0.55 |
| N wt % | 0.18 |
| carbon residue, m % | 3.0 |
| Distillation range, ° C. | |
| Initial Boiling Point | 243 |
| 5% | 294 |
| 10% | 316 |
| 30% | 395 |
| 50% | 429 |
| 70% | 473 |
| 90% | — |

TABLE 4

| Product distribution, wt % | Catalyst | | | | | | | | |
|---|---|---|---|---|---|---|---|---|---|
| | A-1 | A-2 | A-3 | A-4 | A-5 | A-6 | CC-1 | CC-2 | CC-3 |
| Dry gas | 1.03 | 1.05 | 1.04 | 1.02 | 0.99 | 1.00 | 1.23 | 1.18 | 1.09 |
| Liquefied gas | 12.08 | 12.69 | 12.21 | 12.35 | 12.50 | 12.32 | 13.01 | 14.29 | 13.28 |
| Coke | 5.28 | 5.09 | 5.11 | 4.11 | 4.00 | 4.18 | 5.75 | 5.44 | 5.44 |
| Gasoline | 56.88 | 57.22 | 56.48 | 57.69 | 57.98 | 57.81 | 47.17 | 52.76 | 53.87 |
| Diesel oil | 18.79 | 18.01 | 18.67 | 18.46 | 18.02 | 18.79 | 19.91 | 17.95 | 18.01 |
| Heavy oil | 5.94 | 5.94 | 6.49 | 6.37 | 6.51 | 5.9 | 12.93 | 8.38 | 8.31 |
| Total | 100 | 100 | 100 | 100 | 100 | 100 | 100 | 100 | 100 |
| Conversion, wt % | 75.27 | 76.05 | 74.84 | 75.17 | 75.47 | 75.31 | 67.16 | 73.67 | 73.68 |
| Coke Selectivity, wt % | 7.01 | 6.69 | 6.83 | 5.47 | 5.30 | 5.55 | 8.56 | 7.38 | 7.38 |
| light oil yield, wt % | 75.67 | 75.23 | 75.15 | 76.15 | 76.0 | 76.6 | 67.08 | 70.71 | 71.88 |
| Liquefied Gas + Gasoline + Diesel oil, wt % | 87.75 | 87.92 | 87.36 | 88.5 | 88.5 | 88.92 | 80.09 | 85 | 85.16 |

It can be seen from the result of Table 4 that, in comparison with the reference catalyst CC-1, the catalysts made from the molecular sieve (as active component) prepared according to the present invention had a higher conversion, higher light oil yield and liquid yield, as well as lower coke selectivity. In comparison with the reference catalyst CC-2, although the used amount of tetrachlorosilane was sharply reduced according to the present process, the present catalysts had better light oil yield and liquid yield.

Example 10

The NaY molecular sieve (provided by Sinopec, Qilu Division, Si/Al ratio 4.95, Na2O=13.5%, relative crystallinity 85%), a rare-earth chloride solution were introduced at a weight ratio RE₂O₃:molecular sieve:water=0.18:1:100 of to the exchanging drum. The exchanging temperature was 75° C., the exchanging time was 1 hour. The resulting slurry was filtered on the belt filter. After filtration, the filter cake was sent to a dryer. The dried molecular sieve was sent to a calciner. The molecular sieve outlet of the calciner and the molecular sieve inlet of the gas-phase ultra-stabilization reactor were communicated by the connection device as shown in FIG. 10. It comprised three segments. The vertical segment 511 was communicated with the molecular sieve outlet of the calciner. The vertical segment 512 was communicated with the molecular sieve inlet of the gas-phase ultra-stabilization reactor. The angle between the axis of the inclined segment 513 and the horizontal plane was 60°. The inclined segment 513 connected to the vertical segment 511 and the vertical segment 512. The element 514 represented a paddle, and was perpendicular to the axis of the inclined segment 513. The paddle 514 was movable on the cross-section of the inclined segment 513 to control the size of the molecular sieve pathway in the inclined segment 513. The connection of the paddle 514 and the inclined segment 513 was sealed with a sealing material so as to isolate the inner of the inclined segment 513 from the outer environment. The segments 511, 512 and 513 were round tubes with inner diameter of 600 mm.

The gas-phase ultra-stabilization reactor was the gas-phase ultra-stabilization reactor of Example 2. The reaction conditions were identical to Example 2. The used calciner was shown in FIG. 9. On the inner wall of the intermediate barrel 20 were provided with the seizing plate 3 and the dam plate 4. The whole barrel 2 had a diameter of 1 m. The whole barrel 2 has a length of 7 m. The inlet part 24 and the outlet part 25 each had a length of 0.5 m. The intermediate barrel 20 had a length of 6 m. The dam plate 4 was an annulus plate and was welded vertically on the inner wall of the intermediate barrel 20. The dam plate 4 had a height of 10 cm, and a thickness of 5 mm. Two dam plates 4 were present. The intermediate barrel 20 having a length of 6 meters was equally divided into three stages. It was extended along the axis of the intermediate barrel 20 from the connection of the intermediate barrel 20 and the inlet part 24 towards the outlet part 25 by 2 meters to get the location of the first stage. It was further extended by 4 meters to get the location of the second stage. On the inner wall of three-stage intermediate barrel 20 that was equally divided by the dam plate 4, the seizing plate 3 was set for each stage. The seizing plate 3 was rectangular. The angle between the seizing plate 3 in its length direction and the axis of the intermediate barrel 20 was 30°. The seizing plate 3 was vertically welded on the inner wall of the intermediate barrel 20. The height was 10 cm and the thickness was 5 mm. On the inner wall of three-stage intermediate barrel 20 that was equally divided by the dam plate 4, three seizing plates 3 were evenly set for each stage along the circumstance of the intermediate barrel 20. The intermediate barrel 20 was configured so that it can rotate with the rotation mechanism 23. The rotation direction of the seizing plate 3 along the intermediate barrel 20 was extended from the inlet direction of the molecular sieve to the outlet direction of the molecular sieve.

The whole calciner was placed at an inclination angle of 1° of the axis direction of the barrel 2 relative to the horizontal line. The inlet 21 was higher, and the outlet 22 was lower.

The calciner was heated to the calcination temperature of 400° C. The intermediate barrel 20 was rotated (its rotation direction was identical to the direction in which the seizing plates extended along the circumstance from the molecular sieve inlet to the molecular sieve outlet). The Y-type molecular sieve to be calcined was continuously added from the inlet of the barrel 2 to the barrel 2. The Y-type molecular sieve to be calcined was sent to the intermediate barrel 20 for calcination under the rotation effect of the intermediate barrel 20. The calcined Y-type molecular sieve was collected at the outlet 22 of the calciner's barrel 2. Under the set rotation speed of 1.8 rpm for the intermediate barrel 20, the calcination time was 1 hour, the solid content of the molecular sieve at the outlet of the calciner was larger than 98.5 wt %, and the molecular sieve temperature was 310° C.

The test showed that the calciner had better discharging uniformity. The test was as follows. 50 kg of the material was added to the above calciner. Then the molecular sieve was collected at the outlet of the calciner. It can be found that the discharging time of the molecular sieve was 56-64 minutes, and 100% of molecular sieve could be collected. The same calciner with the seizing plate parallel to the axis was used, and the material was discharged in three parts: the first part: 25-29 minutes, 10% of the total discharging, the second part: 40-44 minutes, 30% of the total discharging, the third part: 52-60 minutes, 60% of the total discharging. It could be seen that the calciner had a more uniform discharging, which was favorable for reducing the volume of the calciner.

The invention claimed is:

1. An apparatus for preparing a molecular sieve, comprising:
    an ion-exchanging device in which a Na form molecular sieve is subject to ion-exchanging with an exchange liquor and forms an exchanged molecular sieve;
    a calciner that receives the exchanged molecular sieve and calcines the exchanged molecular sieve;
    a reactor that receives the calcined molecular sieve, wherein the calcined molecular sieve reacts with tetrachlorosilane in the reactor; and
    a gas-solid separator in fluid communication with the reactor, wherein the unreacted tetrachlorosilane is separated from the molecular sieve in the gas-solid separator,
    wherein the reactor comprises a elongated body having a first end and a second end, a molecular sieve inlet, a molecular sieve outlet, and a tetrachlorosilane inlet, the molecular sieve inlet is disposed about the first end of the elongated body, the molecular sieve outlet disposed about the second end of the elongated body, wherein the first end is at a same or a higher position vertically than the second end.

2. The apparatus for preparing the molecular sieve according to claim 1, wherein said reactor is a tubular reactor or a belt transport reactor.

3. The apparatus for preparing the molecular sieve according to claim 1, wherein said reactor comprises a conveying device selected from the group consisting of a gravity conveying device, a mechanical conveying device, a reciprocating piston conveyor, a tube chain conveyor, a screw conveyor, a tube belt conveyor, a tube gravity conveyor, a belt conveyor, and a combination thereof.

4. The apparatus for preparing the molecular sieve according to claim 1, wherein said reactor comprises a tubular body that is rotatable around an longitudinal axis of the tubular body.

5. The apparatus for preparing the molecular sieve according to claim 4, wherein the angle between the longitudinal axis of the tubular body and the horizontal plane ranges from 0° to 90°.

6. The apparatus for preparing the molecular sieve according to claim 4, wherein said reactor comprises at least one seizing plate and/or at least one dam plate, and the seizing plate and the dam plate are installed onto the inner wall of the tubular body.

7. The apparatus for preparing the molecular sieve according to claim 4, wherein the tubular body of said reactor has a length of 5-200 meters, an inner diameter of 0.01-6 meters, and a ratio of the length of the tubular body to the inner diameter of the tubular body of the reactor larger than 1.

8. The apparatus for preparing the molecular sieve according to claim 1, wherein the tetrachlorosilane inlet is disposed about the first end of the elongated body.

9. The apparatus for preparing the molecular sieve according to claim 1, wherein the elongated body comprises a tubular section rotatable around a longitudinal axis of the tubular section, wherein the tubular section is 20% more in length of the elongated body.

10. The apparatus for preparing the molecular sieve according to claim 1, wherein the reactor comprises a tubular outer shell and a tubular inner shell and an annular space between the outer shell and the inner shell is fluidly connected with the molecular sieve inlet and the tetrachlorosilane inlet.

11. The apparatus for preparing the molecular sieve according to claim 1, wherein an imaginary tangent line at any point on the longitudinal axis of the tubular body that points away from the first end is horizontal or points in a downward direction.

12. The apparatus for preparing the molecular sieve according to claim 11, wherein an longitudinal axis of the elongated body drops monotonously from the molecular sieve inlet to the molecular sieve outlet.

13. A process for preparing a molecular sieve, comprising:
    introducing a molecular sieve and a gaseous $SiCl_4$ into a first end of a gas-phase ultra-stabilization reactor;
    transporting the molecular sieve from the first end to a second end of the gas-phase ultra-stabilization reactor without a carrier gas;
    removing the molecular sieve and unreacted tetrachlorosilane from the second end of the gas-phase ultra-stabilization reactor,
    wherein the first end is at a same or a higher position vertically than the second end.

14. The process according to claim 13, wherein a weight ratio of $SiCl_4$ to the molecular sieve is 0.01-1.

15. The process according to claim 13, wherein the molecular sieve and the gaseous $SiCl_4$ are contacted and reacted in the gas-phase ultra-stabilization reactor to produce an ultra-stabilized molecular sieve, and the ultra-stabilized molecular sieve has a relative crystallinity of greater than 50%.

16. The process according to claim 13, wherein the molecular sieve and the gaseous $SiCl_4$ are reacted in the reactor at 250-700° C. for 10 seconds to 100 minutes.

17. The process according to claim 13, wherein the gas-phase ultra-stabilization reactor comprises an elongated body having a longitudinal axis that drops monotonously between the first end and the second end.

18. The process according to claim 13, wherein the gas-phase ultra-stabilization reactor comprises a tubular body and at least a part of the tubular body is rotatable around the longitudinal axis of the tubular body at a rotation speed of 0.05-40 rpm.

19. The process according to claim 13, wherein the molecular sieve is transported from the first end to a second end of the gas-phase ultra-stabilization using a conveying device selected from the group consisting of a gravity conveying device, a mechanical conveying device, a reciprocating piston conveyor, a tube chain conveyor, a screw conveyor, a tube belt conveyor, a tube gravity conveyor, a belt conveyor, and a combination thereof.

* * * * *